(12) United States Patent  
Akae

(10) Patent No.: US 10,044,822 B2
(45) Date of Patent: *Aug. 7, 2018

(54) COMMUNICATION APPARATUS, SERVER, COMMUNICATION APPARATUS CONTROL METHOD, SERVER CONTROL METHOD, RECORDING MEDIUM CONTAINING COMMUNICATION APPARATUS CONTROL PROGRAM AND RECORDING MEDIUM CONTAINING SERVER CONTROL PROGRAM

(71) Applicant: CASIO COMPUTER CO., LTD., Shibuya-ku, Tokyo (JP)

(72) Inventor: Naoki Akae, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/789,204

(22) Filed: Oct. 20, 2017

(65) Prior Publication Data

US 2018/0041596 A1 Feb. 8, 2018

Related U.S. Application Data

(63) Continuation of application No. 15/072,296, filed on Mar. 16, 2016, now Pat. No. 9,838,490.

(30) Foreign Application Priority Data

Jun. 29, 2015 (JP) ................................. 2015-130202

(51) Int. Cl.
*H04B 1/38* (2015.01)
*H04L 29/08* (2006.01)
(Continued)

(52) U.S. Cl.
CPC ............. *H04L 67/22* (2013.01); *G06Q 50/00* (2013.01); *H04L 67/306* (2013.01);
(Continued)

(58) Field of Classification Search
CPC ....... H04L 67/22; H04L 67/306; H06F 17/60; G06Q 50/00; H04M 1/0266; H04W 4/008; H04W 60/04
(Continued)

(56) References Cited

U.S. PATENT DOCUMENTS

2006/0253534 A1* 11/2006 Milheron ............... G09B 23/02
709/205
2008/0298812 A1* 12/2008 Nagatomo ......... H04B 10/1149
398/173

(Continued)

FOREIGN PATENT DOCUMENTS

JP 2007304656 A 11/2007
JP 2012168827 A 9/2012

OTHER PUBLICATIONS

Extended European Search Report (EESR) dated Nov. 18, 2016 issued in counterpart European Application No. 16175651.5.

*Primary Examiner* — Md Talukder
(74) *Attorney, Agent, or Firm* — Holtz, Holtz & Volek PC

(57) ABSTRACT

A communication apparatus includes a memory and a processor. The processor is configured to perform operations including acquiring device IDs and calculation data items from a plurality of calculation devices, respectively, each device ID and each calculation data item being in association with each other. In a case where a group ID stored in the memory is selected, transmitting names data items corresponding to the acquired device IDs and the acquired calculation data items corresponding to the acquired device IDs, in association with the group ID to a server, and receiving an integrated data item being obtained based on (Continued)

the names data items and the acquired calculation data items associated with the group ID.

19 Claims, 24 Drawing Sheets

(51) Int. Cl.
  *G06Q 50/00* (2012.01)
  *H04M 1/02* (2006.01)
  *H04W 60/04* (2009.01)
  *H04W 4/00* (2018.01)
  *H04W 4/80* (2018.01)

(52) U.S. Cl.
  CPC ......... *H04M 1/0266* (2013.01); *H04W 4/008* (2013.01); *H04W 4/80* (2018.02); *H04W 60/04* (2013.01)

(58) Field of Classification Search
  USPC .............................. 455/566, 41.1, 41.2, 41.3
  See application file for complete search history.

(56) References Cited

U.S. PATENT DOCUMENTS

| | | | | |
|---|---|---|---|---|
| 2010/0227304 | A1* | 9/2010 | Horikawa | G09B 5/14 434/350 |
| 2012/0322374 | A1* | 12/2012 | Yamaoka | H01Q 1/125 455/41.1 |
| 2013/0266921 | A1* | 10/2013 | Jenks | G09B 5/10 434/350 |
| 2014/0154987 | A1* | 6/2014 | Lee | H04W 76/14 455/41.2 |
| 2014/0370489 | A1* | 12/2014 | Mayumi | G09B 7/07 434/365 |
| 2015/0149331 | A1* | 5/2015 | Joseph | G06Q 10/087 705/28 |
| 2016/0085845 | A1* | 3/2016 | Yoshizawa | H04L 65/4069 709/204 |
| 2016/0086513 | A1* | 3/2016 | Uejima | G09B 19/025 434/201 |
| 2016/0171636 | A1* | 6/2016 | Mayumi | G06Q 50/20 705/326 |
| 2016/0381159 | A1* | 12/2016 | Akae | H04L 67/22 455/566 |

\* cited by examiner (CONT.)

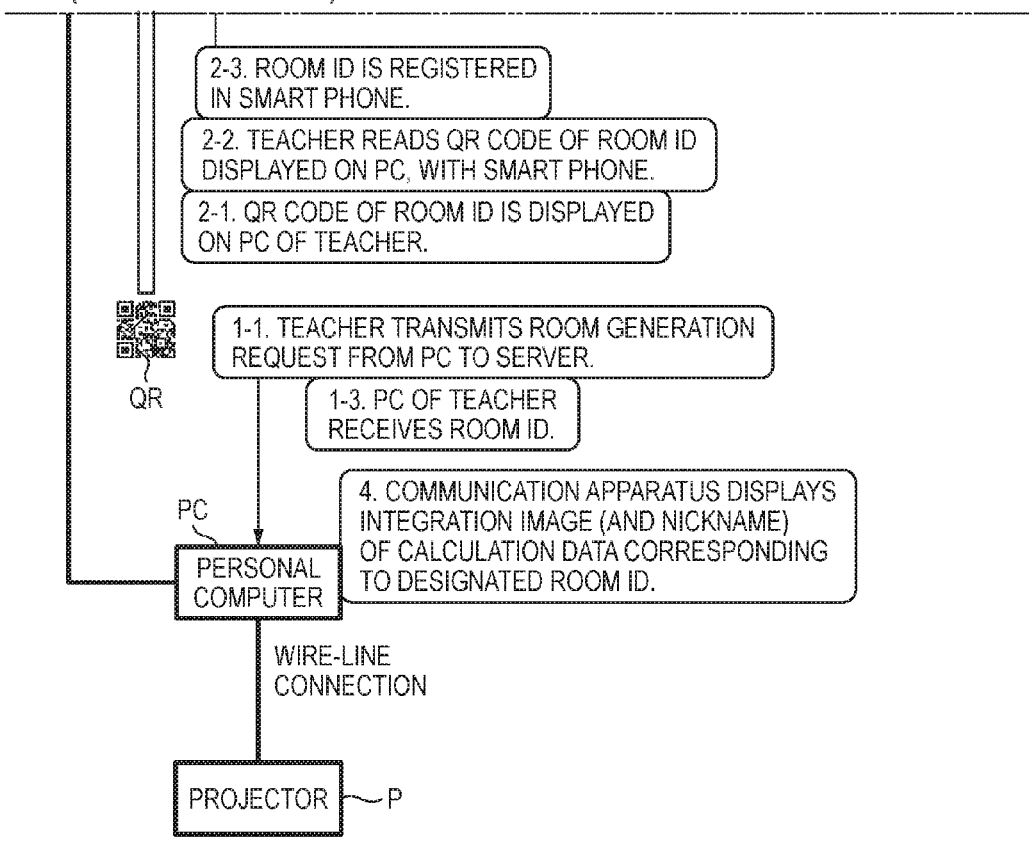

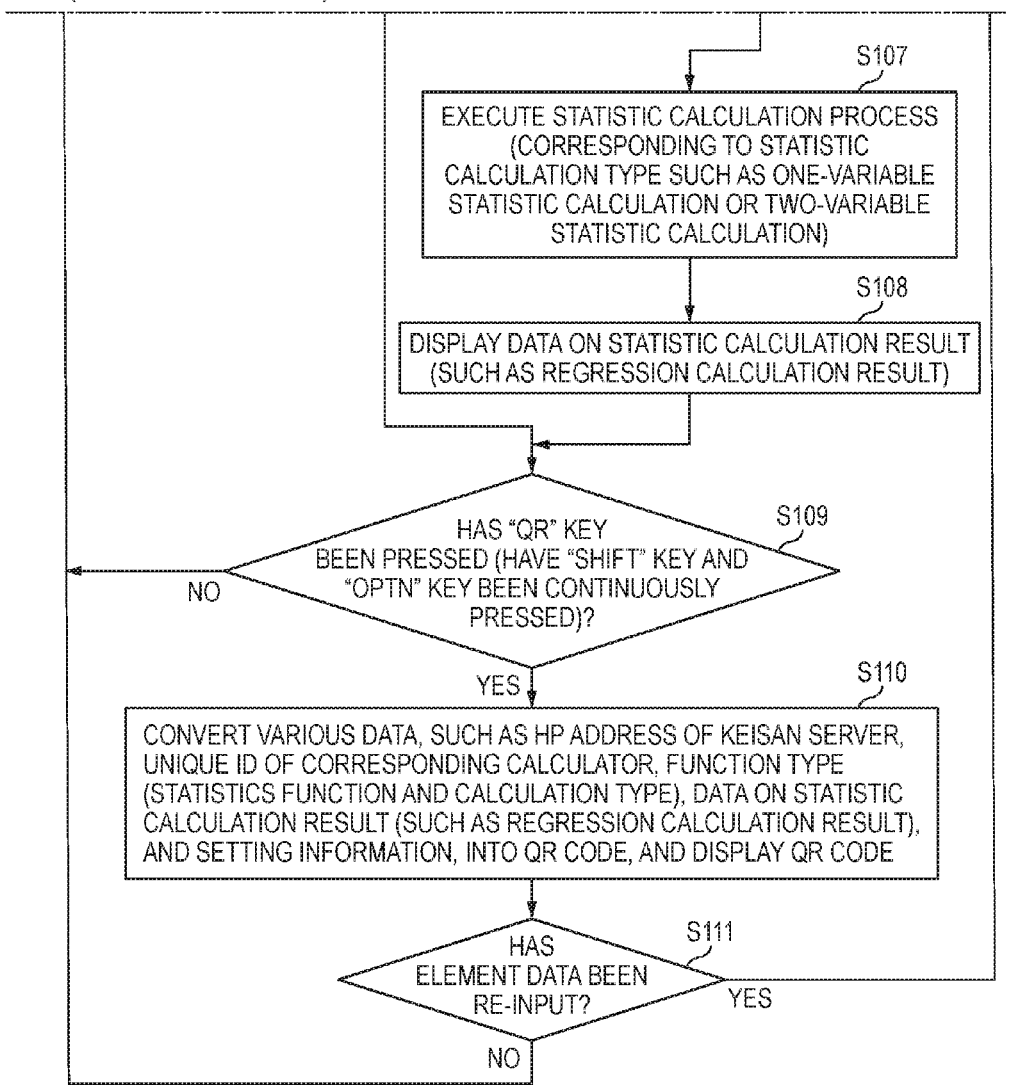

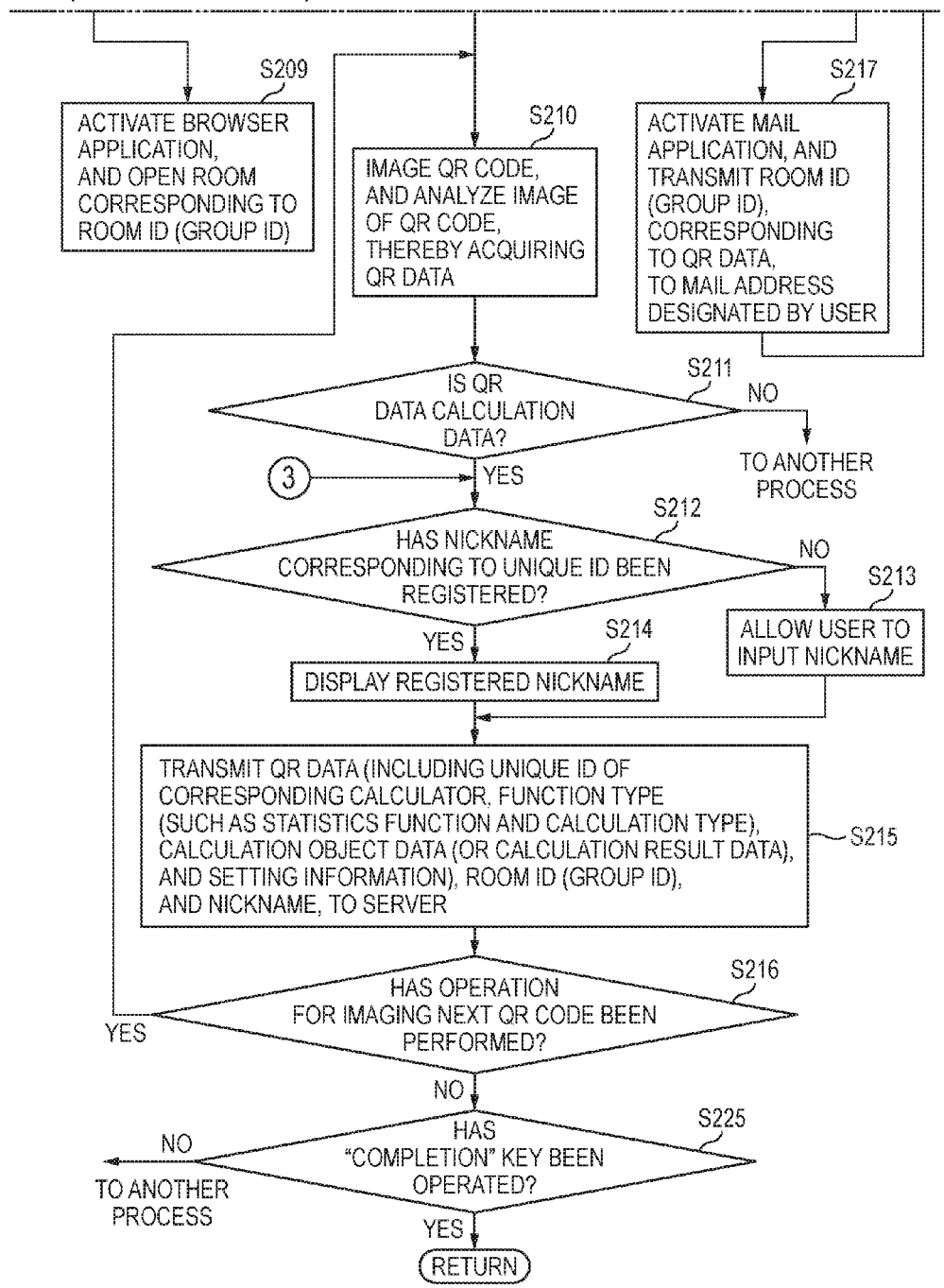

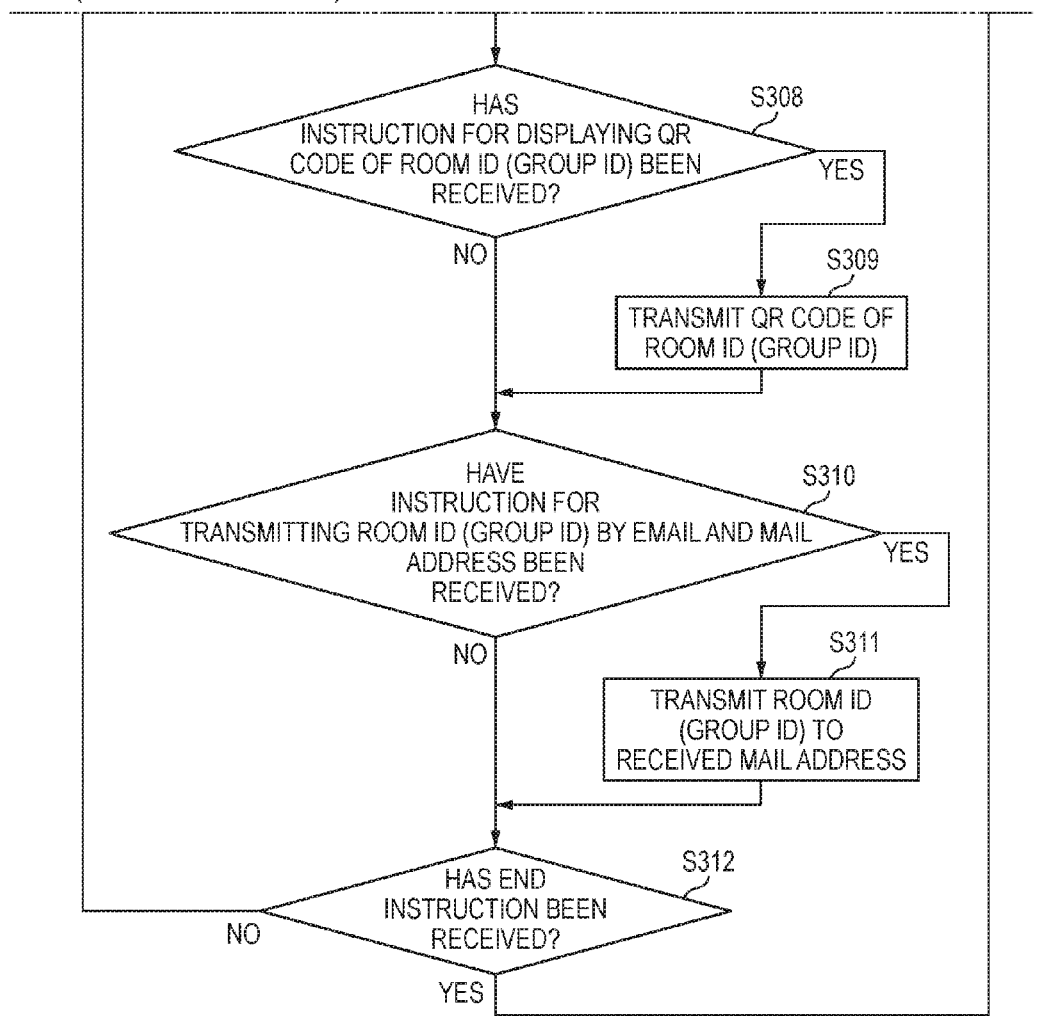

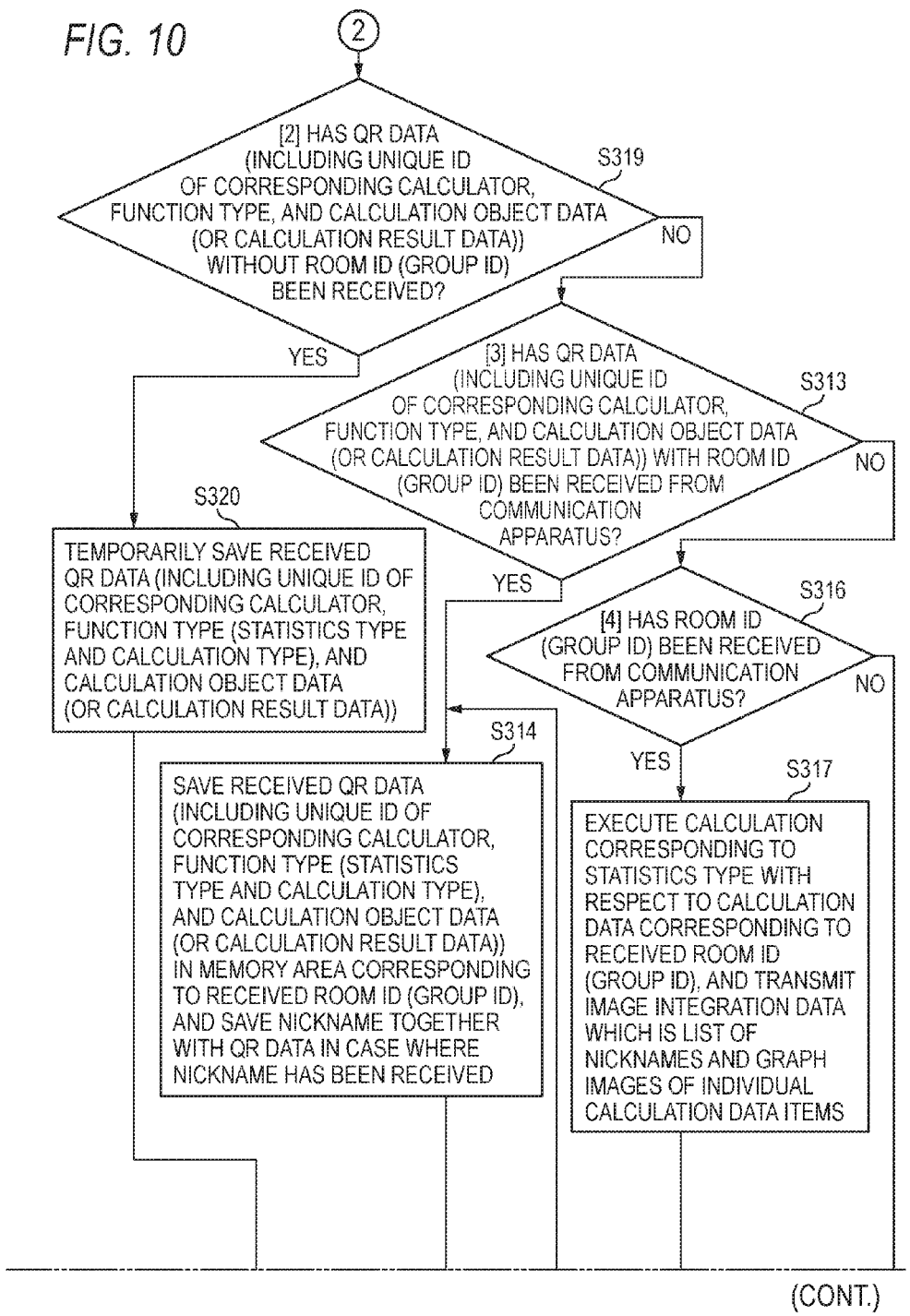

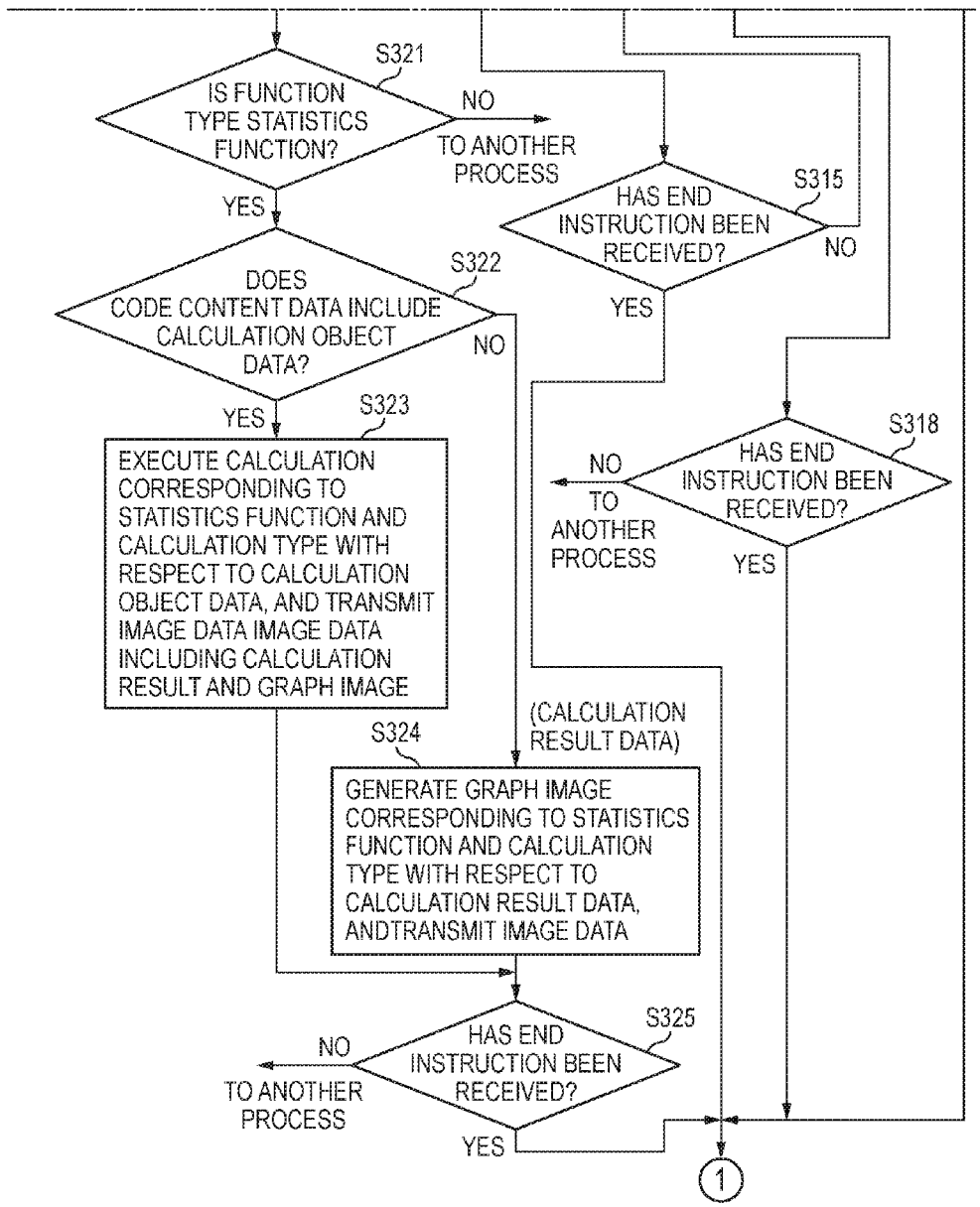

FIG. 12A
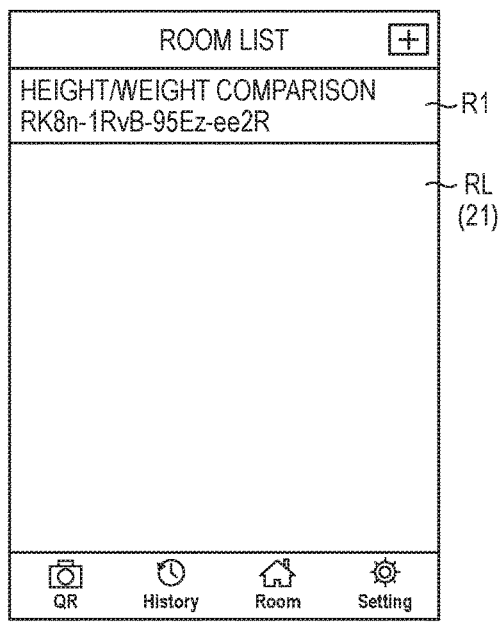
FIG. 12B
FIG. 12C
FIG. 12D
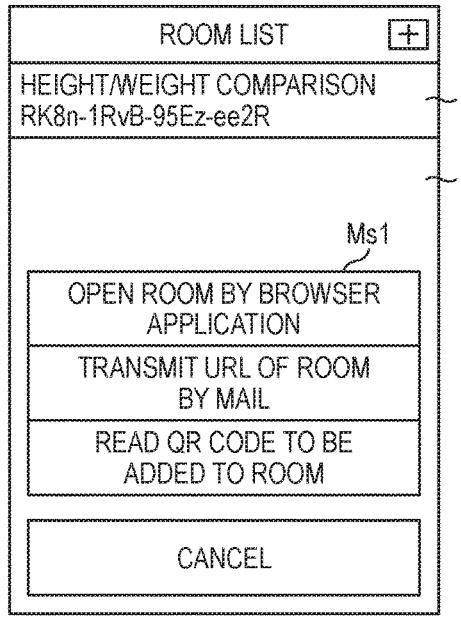
FIG. 12E
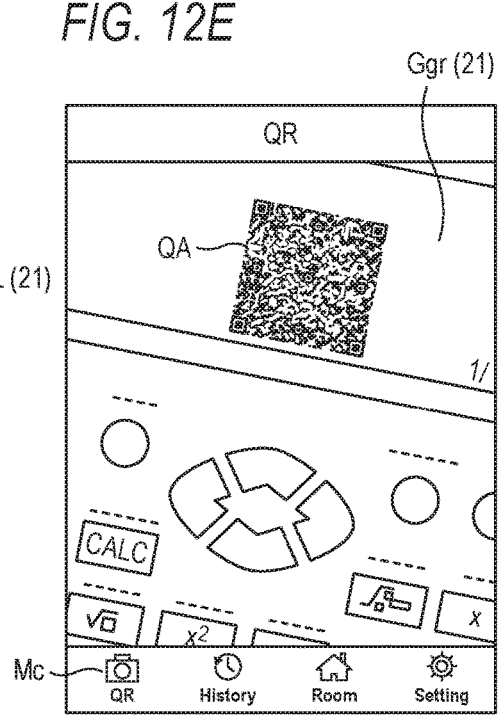

COMMUNICATION APPARATUS, SERVER, COMMUNICATION APPARATUS CONTROL METHOD, SERVER CONTROL METHOD, RECORDING MEDIUM CONTAINING COMMUNICATION APPARATUS CONTROL PROGRAM AND RECORDING MEDIUM CONTAINING SERVER CONTROL PROGRAM

CROSS-REFERENCE TO RELATED APPLICATIONS

The present application is a Continuation application of U.S. Ser. No. 15/072,296, filed Mar. 16, 2016, which claims the priority of Japanese Patent Application No. 2015-130202, filed Jun. 29, 2015, the contents of both of which are incorporated herein by reference.

BACKGROUND OF THE INVENTION

Field of the Invention

The present invention relates to a communication apparatus capable of integrating calculation data items, a server, a communication apparatus control method, a server control method, a recording medium containing communication apparatus control program, a recording medium containing server control program, and so on.

Description of the Related Art

Information display apparatuses for teaching various function expression calculation processes, called scientific calculators, have been widely used.

As a form in which those information display apparatuses are used, JP-A-2012-168827 proposes a system which is usable to display and analyze graphs of function expressions. for example, in a class at school, and in which students use their information display apparatuses, and an information display apparatus which a teacher uses receives calculation data items such as graph data items from the information display apparatuses of the individual students by infrared communication or the like, and integrates the received calculation data items, thereby obtaining integrated calculation data, and magnifies and projects the integrated calculation data.

SUMMARY OF THE INVENTION

Also, in recent, compute servers which allow users to access the computer servers with communication apparatuses such as smart phones and receive highly functional computation services on the Internet have been provided.

In the system disclosed in JP-A-2012-168827, an information display apparatus receives a plurality of graph expression data items from a plurality of information display apparatuses, and integrally displays graph images of the graph expression data items in one coordinate system; however, the individual information display apparatuses need to be associated with one another and be connected to one another such that communication is possible, in advance.

Also, in the above described system, graph expressions from the plurality of information display apparatuses are distinguishably displayed in different colors; however, the names of the users of the plurality of information display apparatuses cannot be displayed.

The present invention was made in view of those problems, and an object of the present invention is to provide a communication apparatus capable of integrating a name and calculation data items associated with each information display apparatus, a server, a communication apparatus control method, a communication apparatus control program, and so on.

A communication apparatus according to the present invention includes a memory and a processor. The processor is configured to perform operations including: storing group IDs; acquiring device IDs and calculation data items from a plurality of calculation devices, respectively, each device ID and each calculation data item being in association with each other; registering names in association with the acquired device IDs; and transmitting (i) the registered names corresponding to the acquired device IDs, in association with the stored group IDs, to a server and (ii) the calculation data items corresponding to the acquired device IDs, in association with the stored group IDs, to a server.

A server according to the present invention includes: a processor and a communication unit. The communication unit communicates with at least one communication apparatus. The processor is configured to perform operations including: transmitting an integrated data item of names and calculation data items associated with one group ID to the communication apparatuses in a case where other names and other calculation data items associated with the corresponding group ID are received from the communication apparatuses; and in a case where the corresponding calculation data items is received without being associated with the group ID, transmitting image data corresponding to the received calculation data items, to the communication apparatuses.

BRIEF DESCRIPTION OF THE DRAWINGS

FIG. 10 is a flow chart illustrating the other part of the server process of the compute server 30.

FIGS. 12A to 12E are views illustrating others of the display operations of the computer system.

DETAILED DESCRIPTION OF THE INVENTION

Hereinafter, an embodiment of the present invention will be described with reference to the accompanying drawings.

Figure 1:
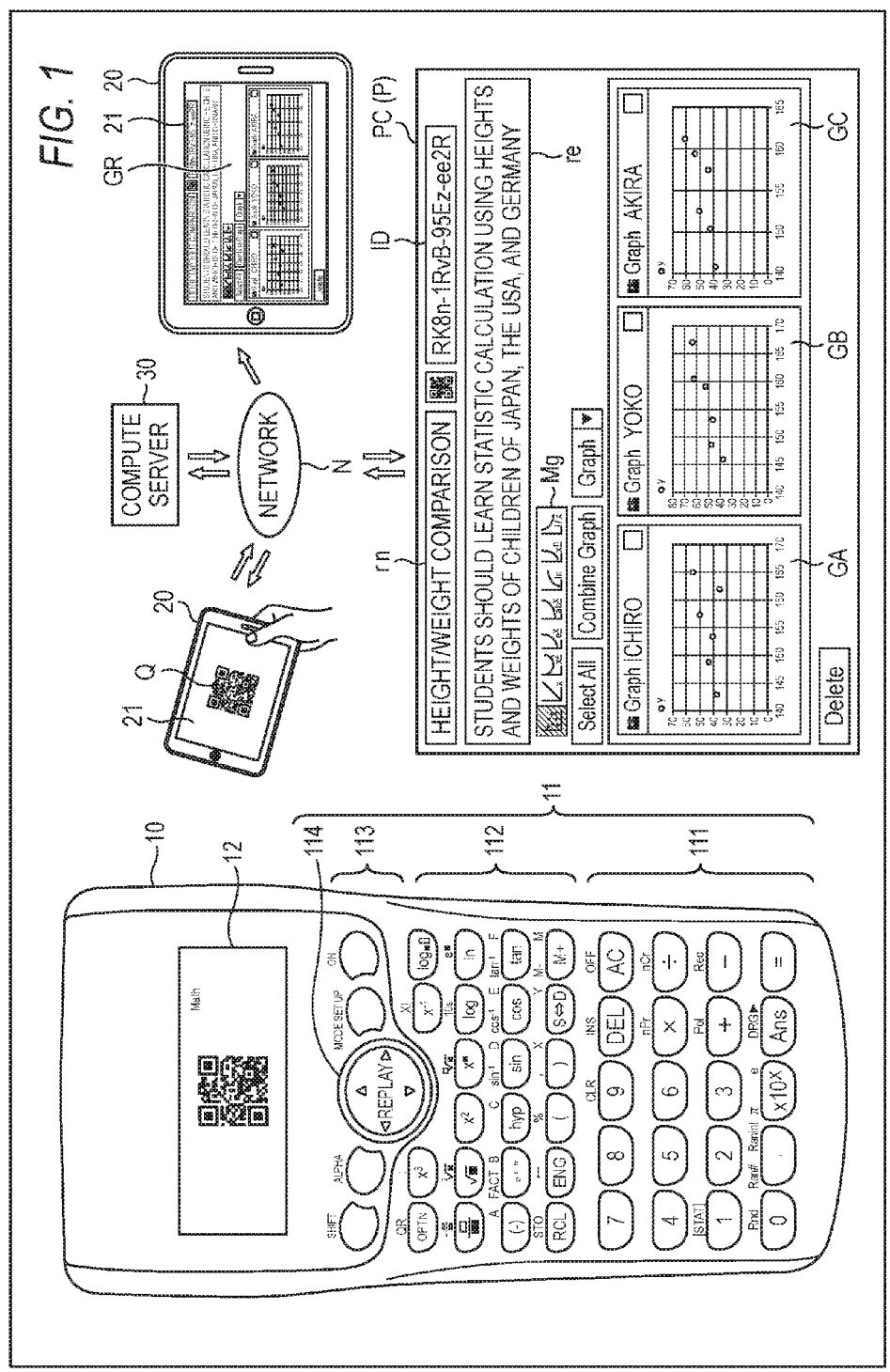
FIG. 1 is a schematic view illustrating the configuration of a computer system according to an embodiment of the present invention.

FIG. 1 is a schematic view illustrating the configuration of a computer system according to an embodiment of the present invention.

Here, as an example, a system configured as shown in FIG. 1 will be described. The system includes: scientific calculators (calculation device) 10 that are information display apparatuses which are used by students; a communication apparatus 20 with a camera, such as a tablet PC with a camera, that a teacher uses to acquiring images Q of two-dimensional codes such as QR codes (a trademark) displayed on the scientific calculators 10 of the students; a compute server (a server) 30 that receives calculation data items according to the contents of the two-dimensional codes, from the communication apparatus 20 with the camera, through a communication network N such as the Internet, and integrates the received calculation data items with respect to each of different rooms (groups) created depending on subjects (the contents of calculation) by pre-access from a personal computer PC (or the communication apparatus 20) of the teacher, thereby generating integrated calculation data items; and the personal computer PC (or the communication apparatus 20) that receives the integrated calculation data items of the rooms (the groups) from the compute server 30 through the communication network N, and displays the integrated calculation data items; and a projector P that magnifies and projects the integrated calculation data items displayed on the personal computer PC (the communication apparatus 20).

Also, in association with the calculation data items of each scientific calculator 10 which are transmitted from the communication apparatus 20 to the compute server 30, the room IDs (group IDs) of rooms (groups) depending on their calculation types, and the nickname of the user (student) of the corresponding scientific calculator 10 are transmitted.

In the present embodiment, the following specific example will be described. Three students "A", "B", and "C" collect sample data items of the heights X and weight Y of children of Japan, America, and Germany, respectively, and aggregates the collected sample data items in their scientific calculators (information display apparatuses) 10, respectively. When learning the collected sample data items by a statistic calculation function, the students operate their scientific calculators 10 such that each calculator displays calculation data items for corresponding statistic calculation, as an image Q of a two-dimensional code (a QR code) including the unique ID of the calculator. In this case, in advance, the teacher accesses the homepage (HP) address of the compute server (a server) 30 with the personal computer PC (or the communication apparatus 20 with the camera), and creates a room (group) "HEIGHT/WEIGHT COMPARISON" according to the type of the corresponding statistic calculation, and acquires a room ID (a group ID) "RK8n-1RvB-95Ez-ee2R" for the created room. Thereafter, the teacher sequentially images the images Q of the two-dimensional codes (QR codes) displayed on the scientific calculators 10 of the individual students "A", "B", and "C", with the communication apparatus 20 with the camera, and inputs the nicknames "ICHRO", "YOKO", and "AKIRA" of the individual students, and transmits data items on the contents of the two-dimensional codes (the QR codes) together with the room ID (the group ID) and the corresponding nicknames to the compute server 30. Then, if the compute server 30 receives the calculation data items of the individual students "A", "B", and "C", the server registers the calculation data items in a memory area for the room (the group) "HEIGHT/WEIGHT COMPARISON" corresponding to the room ID (the group ID), and integrates the calculation data items, thereby obtaining an integrated calculation data item, and outputs the integrated calculation data item to an external apparatus (for example, the personal computer PC of the teacher, or the communication apparatus 20 with the camera which is the data transmission source), such that the external apparatus displays the integrated calculation data item as a display screen GR of the corresponding room "HEIGHT/WEIGHT COMPARISON".

Also, the communication apparatus 20 with the camera is not limited to a tablet PC with a camera, and can be configured as any other apparatus such as a personal digital assistant (PDA) with a camera, a smart phone with a camera, a laptop PC (personal computer) with a camera or connected to a camera, or an electronic blackboard.

Also, although FIG. 1 shows two communication apparatuses 20 with cameras, actually, for each of a main class teacher and assistant class teachers, one communication apparatus 20 with a camera is prepared. Also, although FIG. 1 shows one scientific calculator 10 as a representative, actually, the number of scientific calculators which are included depends on the number of students. Also, one more scientific calculator 10 for a teacher may be further included.

Each scientific calculator 10 is configured in a small size due to the necessity of portability such that a user can sufficiently grip it with one hand and operate it with one hand. On the front surface of the main body of each scientific calculator 10, a key input unit 11 and a display output unit 12 are provided.

Each key input unit 11 includes a numerical-value/operation-symbol key group 111 for inputting numbers or expressions, or instructing calculation execution, an arithmetic-function/function key group 112 for inputting various functions or starting a memory function, a mode setting key group 113 for displaying a menu screen of various operating modes or instructing setting of an operating mode, and a cursor key 114 for performing an operation to move a cursor displayed on the display output unit 12, an operation to select a data item, etc.

Each display output unit 12 is composed of a dot matrix type liquid crystal display unit.

Figure 2:
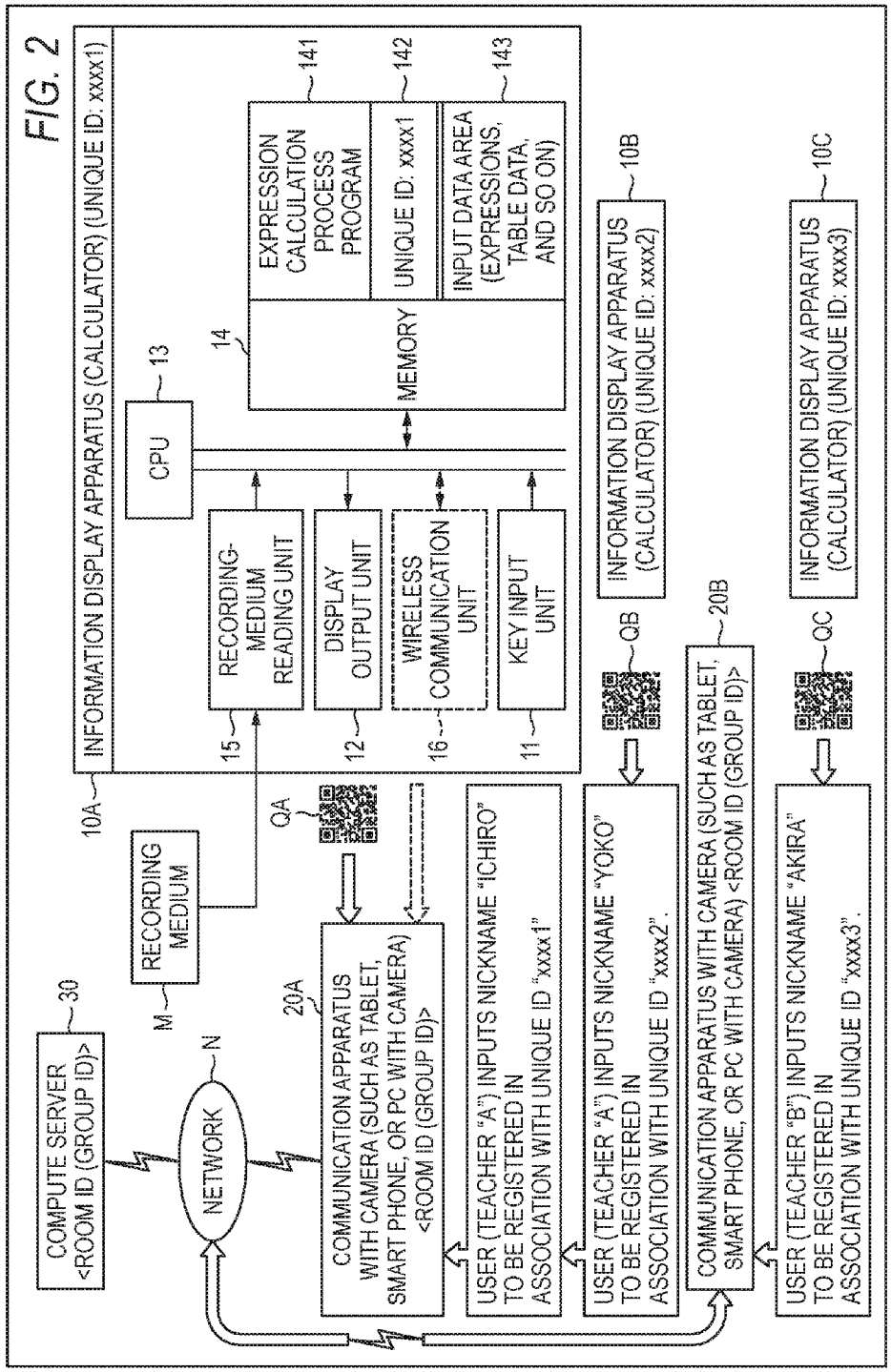
FIG. 2 is a block diagram illustrating the configuration of an electronic circuit of a scientific calculator 10.

FIG. 2 is a block diagram illustrating the configuration of an electronic circuit of a scientific calculator 10.

Now, one of scientific calculators 10A, 10B, 10C, and so on, of a plurality of students "A", "B", "C", and so on, will be described as a scientific calculator 10.

The electronic circuit of the scientific calculator 10 includes a CPU 13 which is a computer, a memory 14, and a recording-medium reading unit 15, in addition to the key input unit 11 and the display output unit 12. Also, as shown by a broken line in FIG. 2, the electronic circuit may include a wireless communication unit 16.

The CPU 13 controls the operations of the individual units of the circuit according to an expression calculation process program 141 stored in the memory 14, thereby executing a variety of arithmetic processing according to key input signals from the key input unit 11. The expression calculation process program 141 may be stored in the memory 14 in advance, or may be loaded from an external recording medium M such as a memory card into the memory 14 through the recording-medium reading unit 15. The expression calculation process program 141 is configured such that a user cannot rewrite the corresponding program by operating the key input unit 11.

In the memory 14, as other information which the user cannot rewrite, a unique calculator ID (a unique device ID) 142 is also stored. Unique calculator IDs 142 are IDs unique to the scientific calculators 10A, 10B, 10C, and so on, respectively.

In the memory 14, in order to store data which the user can rewrite, besides such information which the user cannot rewrite, an input data area 143 is reserved.

Also, function types, such as statistics functions (such as one-variable statistic and two-variable statistics) and calculation types of the statistics functions (such as linear regression, logarithmic regression, e-exponential regression, ab-exponential regression, power regression, inverse regression, and quadratic regression), set according to operations on a "MODE" key of the key input unit 11, and data items to be statistic calculation objects, such as table data, are stored. In a case whether the number of variables is 1, a table data item includes a numerical value data item corresponding to a variable "X"; whereas, in a case where the number of variables is two, a table data item includes numerical value data items corresponding to variables "X" and "Y", respectively.

Hereinafter, data items such as table data to be calculation objects will be referred to as calculation object data items, and data items obtained by calculating the calculation object data items according to the calculation types of the statistics functions will be referred to as calculation result data items, and the types of calculation functions such as statistics functions, the calculation types of the calculation function types, the calculation object data items, and the calculation result data items are collectively referred to as calculation data items.

Also, the wireless communication unit 16 has a function of performing wireless communication with external apparatuses such as the communication apparatus 20 with the camera by Bluetooth (a trademark), infrared communication, or the like.

The CPU 13 of the scientific calculator 10 configured as described above controls the operations of the individual units of the circuit according to commands described in the expression calculation process program 141, such that software and hardware operate in cooperation with each other, thereby implementing a display control function of converting a variety of data such as the unique ID of the corresponding scientific calculator 10, a function type (for example, a statistic calculation function and a calculation type of the statistic calculation function) input from the key input unit 11, function-based calculation data items (for example, calculation object data items for statistic calculation) or calculation result data items (for example, calculation result data items of statistic calculation), and setting information, into a two-dimensional code (in the present embodiment, a QR code), and displaying the two-dimensional code by the display output unit 12, as will be described below in regards to operations.

The communication apparatuses 20 (20A and 20B) with the cameras image acquire QA, QB, QC, and so on, of two-dimensional codes (QR codes) displayed on the display output units 12 of the scientific calculators 10A, 10B, 10C, and so on, and add the nicknames of corresponding students, and the room ID (the group ID) acquired in advance, to data on the contents of the images QA, QB, QC, and so on, of the two-dimensional codes (QR codes) (unique calculator IDs and calculation data items), and transmit the results to the compute server 30 having the HP address set in advance, through the communication network N.

Also, the data on the contents (the unique calculator IDs and the calculation data items) of the two-dimensional codes (the QR codes) QA, QB, QC, and so on, may be transmitted from the scientific calculators to the communication apparatuses 20A and 20B with the cameras by the wireless communication unit 16.

Figure 3:
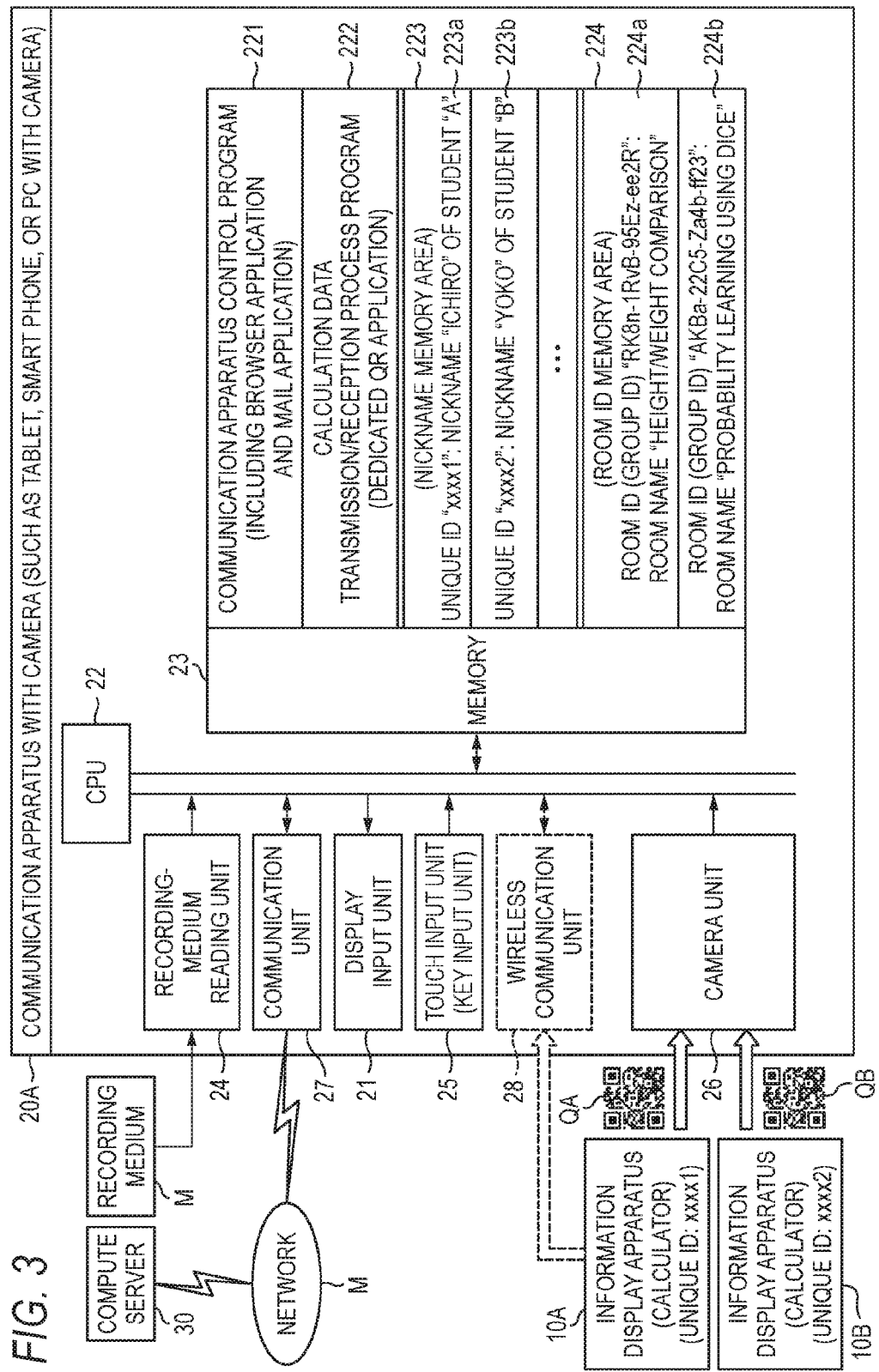
FIG. 3 is a block diagram illustrating the configuration of an electronic circuit of a communication apparatus 20 with a camera.

FIG. 3 is a block diagram illustrating the configuration of an electronic circuit of a communication apparatus 20 with a camera.

Hereinafter, one of the communication apparatuses 20A and 20B with the cameras of a plurality of teachers (for example, a main class teacher and an assistant class teacher) will be described as a communication apparatus 20 with a camera.

The electronic circuit of the communication apparatus 20 with the camera includes a CPU 22 which is a computer, a memory 23, a recording-medium reading unit 24, a touch input unit 25 superimposed on the display output unit 21 and integrated with the display output unit, a camera unit 26, and a communication unit 27, in addition to the display output unit 21. Also, the touch input unit 25 may include a key input unit such as a power key. Also, as shown by a broken line in FIG. 2, the electronic circuit may include a wireless communication unit 28.

The CPU 22 controls the operations of the individual units of the circuit according to a communication apparatus control program (including a browser application and a mail application) 221 and a calculation data transmission/reception program 222 (a dedicated QR application) 222 stored in the memory 23, in response to touch (or key) input signals from the touch input unit 25 and signals received by the communication unit 27 (28). Each of the programs 221 and 222 may be stored in the memory 23 in advance, or may be a program read from an external recording medium M such as a memory card through the recording-medium reading unit 24 and stored in the memory 23, or may a program downloaded from a Web server on the communication network N and stored in the memory 23.

Also, in the memory 23, a nickname memory area 223 and a room ID memory area 224 are reserved.

In a case of imaging the two-dimensional codes (the QR codes) QA, QB, QC, and so on, displayed on the scientific calculators 10A, 10B, 10C, and so on of the students "A", "B", "C", and so on, with the camera unit 26 according to the calculation data transmission/reception program (the dedicated QR application) 222, in the nickname memory area 223, the nicknames "ICHRO", "YOKO", and so on, of the corresponding students "A", "B", "C", and so on, input by touching the touch input unit 25 (or pressing keys) are stored in association with data items on the contents of the corresponding two-dimensional codes (the QR codes) QA, QB, QC, and so on, (calculation data items and unique calculator IDs such as "xxxx1" and "xxxx2"). Additionally, each name corresponding to each device ID may be any one of a user's name, a nickname, a number and symbol of each device ID. For example, it would be "the student number of ICHIRO is 012", "the student number of YOKO is 34", and so on.

The room IDs (group IDs) and room names of rooms (groups) created depending on calculation types are stored in advance by accessing the compute server 30 with the personal computer PC (or the communication apparatus 20 with the camera) of the teacher are acquired and stored in the room ID memory area 224.

Also, the wireless communication unit 28 may be configured to have a function of performing wireless communication with external information display apparatuses (such as the scientific calculators 10) by Bluetooth (a trademark), infrared communication, or the like, such that the wireless communication unit 28 can receive the data items on the contents (the calculation data items and the unique calculator IDs) of the two-dimensional codes (the QR codes) QA, QB, QC, and so on, displayed on the scientific calculators 10A, 10B, 10C, and so on, of the individual students "A", "B", "C", and so on, from the scientific calculators 10A, 10B, 10C, and so on, by wireless communication.

In this configuration, the CPU 22 of the communication apparatus 20 with the camera controls the operations of the individual units of the circuit according to commands described in the communication apparatus control program 221 and the calculation data transmission/reception program (the dedicated QR application) 222, such that software and hardware operate in cooperation with each other, thereby implementing a QR image transmitting function of reading two-dimensional codes (in the present embodiment, QR codes) displayed on the scientific calculators 10, and adding nicknames and room IDs (group IDs) to data items on the contents of the two-dimensional codes (the QR codes), and transmitting the results to the compute server 30, as will be described below in regards to operations.

Figure 4:
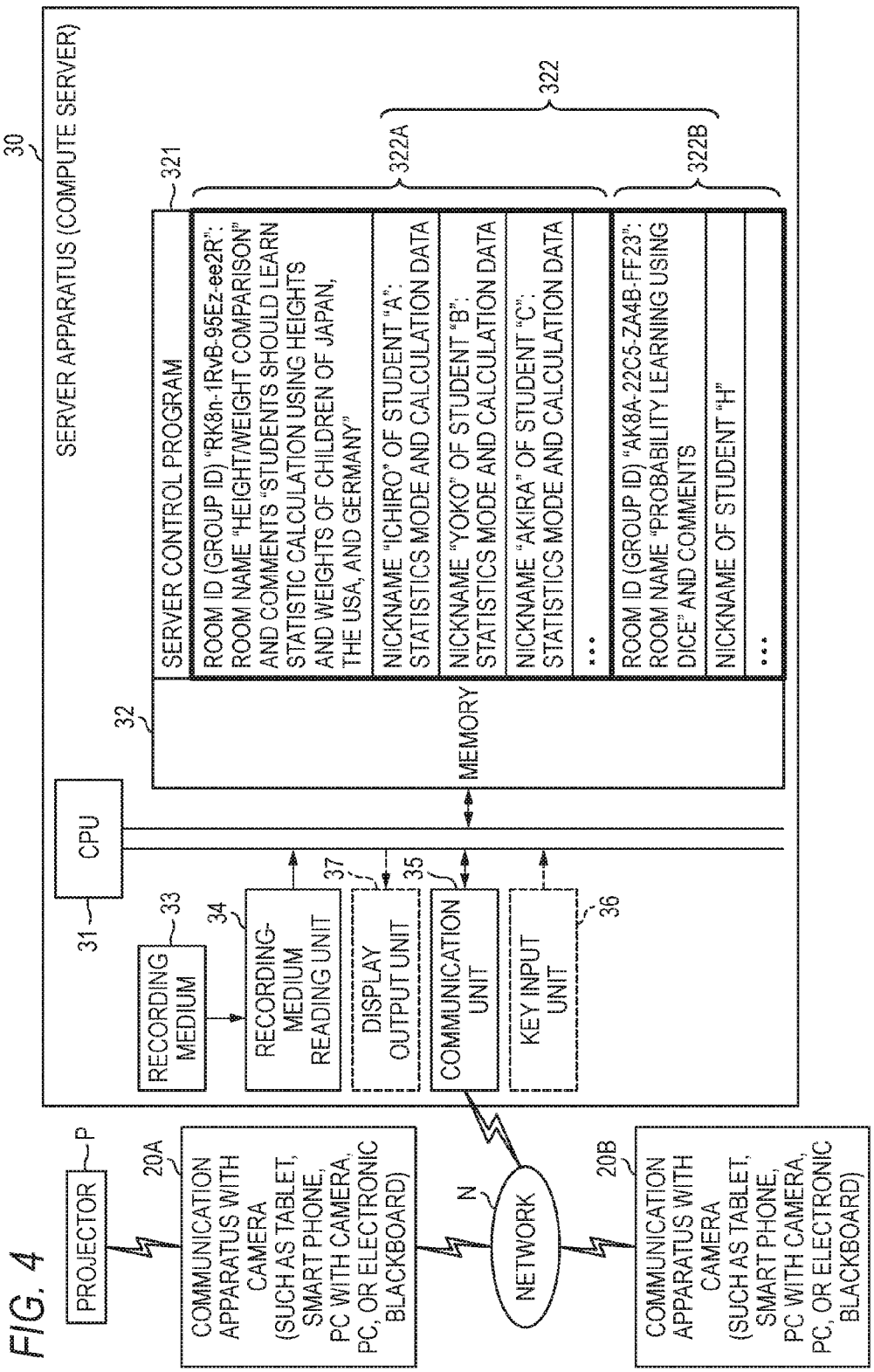
FIG. 4 is a block diagram illustrating the configuration of an electronic circuit of a compute server 30.

FIG. 4 is a block diagram illustrating the configuration of an electronic circuit of the compute server 30.

The electronic circuit of the compute server 30 includes a CPU 31 which is a computer, a memory 32, a recording medium 33, a recording-medium reading unit 34, and a communication unit 35. Also, as shown by broken lines in FIG. 4, the electronic circuit may include a key input unit 36 or a display output unit 37.

The CPU 31 controls the operations of the individual units of the circuit according to a server control program 321, thereby executing a variety of arithmetic processing according to the content data items of two-dimensional codes (QR codes) having room IDs (group IDs) and nicknames added thereto and received from the communication apparatuses 20A and 20B with the cameras through the communication unit 35. The server control program may be stored in the memory 32 in advance or may be read from the recording medium 33 such as a memory card into the memory 32 through the recording-medium reading unit 34, or may be downloaded from a Web server on the communication network N to the memory 32 through the communication unit 35.

In the memory 32, the server control program 321 is stored, and registration data memory 322 is reserved to register the content data items (QR data items) of two-dimensional codes, received from the individual communication apparatuses 20A and 20B with the cameras through the communication unit 35, in association with room IDs (group IDs) is reserved. In this case, in the registration data memory 322, dedicated data areas 322A, 322B, and so on, to room IDs (group IDs) are reserved. In those areas, the content data items (QR data items) of two-dimensional codes read from the scientific calculators 10A, 10B, and so on, of the individual students "A", "B", and so on, by the communication apparatuses 20A and 20B with the cameras of the teachers can be registered with the nicknames of the students, as room-based (group-based) data items.

In the present embodiment, the registration data memory 322 associated with the room IDs (group IDs) of different rooms (groups) depending on calculation types in advance by access from the personal computer PC (or the communication apparatus 20 with the camera) of the teacher is reserved. Then, the content data items (QR data items) of two-dimensional codes of the individual students "A", "B", and so on, which are received from the teacher's communication apparatuses 20A and 20B with the cameras are registered with room IDs (group IDs) are registered with the nicknames of the individual students "A", "B", and so on, in the data areas, such as the data area 322A, corresponding to the received room IDs (group IDs).

Also, the server control program 321 has various functions such as a function of performing a setting operation or a maintenance operation according to operations, such as a setting operation or a maintenance operation, which an operator of the compute server 30 performs on the key input unit 36, and a function of displaying the intermediate progress or result of each operation of the server control program on the display output unit 27.

The CPU 31 of compute server 30 configured as described above controls the operations of the individual units of the circuit according to commands described in the server control program 321 such that software and hardware operate in cooperation with each other, thereby implementing a server process function of integrating calculation data items based on two-dimensional code content data items (QR data items) received from the individual students, with respect to each of different rooms (groups) depending on calculation types, thereby obtaining integrated calculation data items for the individual rooms (groups), and transmitting the integrated calculation data items to the personal computer PC of the teacher and the teacher's communication apparatuses 20A and 20B with the cameras which are the transmission sources of the two-dimensional code content data items (the QR data items), as will be described below in regards to operations.

If the integrated calculation data items are received from the compute server 30 through the communication network N, the personal computer PC or the communication apparatus 20A or 20B with the camera of the teachers can display the received data items on their display output units 21, or the personal computer PC or the communication apparatus 20A or 20B may be connected to a projector P which magnifies and projects the integrated calculation data items.

Figure 5:
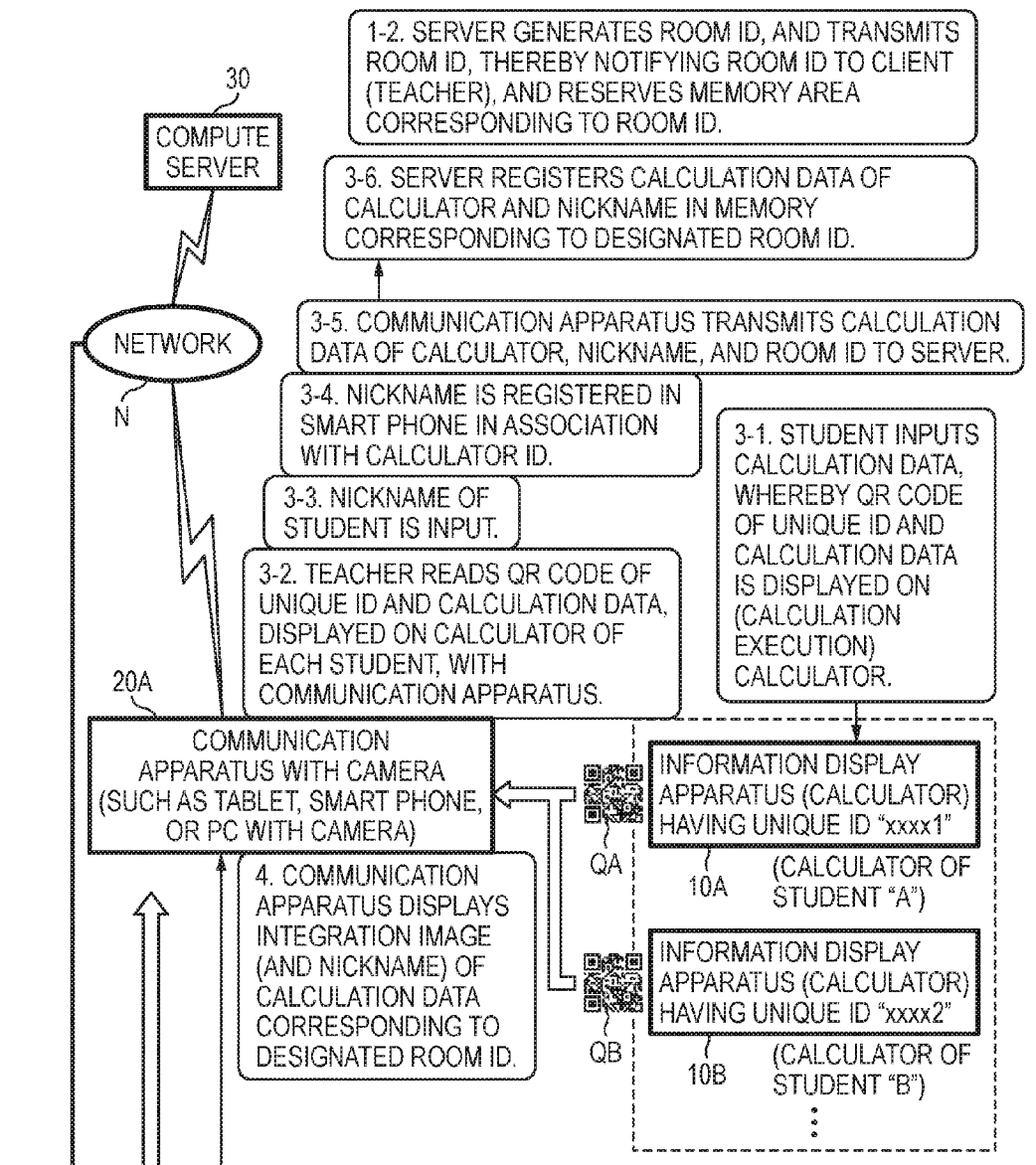
FIG. 5 is a view for explaining the outline of general operations of the computer system.

FIG. 5 is a view for explaining the outline of the general operations of the computer system.

1-1. The teacher accesses the HP address of the compute server 30 with the personal computer PC, and transmits a request for generating a room (a group) according to a calculation type to be taught to the students, from the personal computer PC.

1-2. The compute server 30 generates a unique room ID (group ID) in response to the room (group) generation request received from the personal computer PC of the teacher, and notifies the generated room ID (group ID) to the personal computer PC which is the request source, and reserves a memory area corresponding to the generated room ID (group ID), in the registration data memory 322.

1-3. The room ID (the group ID) notified from the compute server 30 is received and saved by the personal computer PC of the teacher.

2-1. The personal computer PC of the teacher converts the saved room ID (group ID) into a two-dimensional code (a QR code), and displays an image QR of the two-dimensional code.

2-2. The image QR of the two-dimensional code (the QR code) of the room ID (the group ID) displayed on the personal computer PC of the teacher is read by the teacher's communication apparatus 20A with the camera (a tablet PC).

2-3. The room ID (the group ID) corresponding to the image QR of the two-dimensional code (the QR code) read by the teacher's communication apparatus 20A with the camera (a tablet PC) is registered.

3-1. If the students "A", "B", "C", and so on, input their calculation data items as calculation data items of statistic calculation according to the calculation type (for example, international comparison in the heights and weights of children) to be learned by the corresponding students (for example, the student "A" inputs height/weight sample data items of children of Japan, and the student "B" inputs height/weight sample data items of children of America, and the student "C" inputs height/weight sample data items of children of Germany), to their information display apparatuses (the scientific calculators) 10A, 10B, 10C, and so on, the corresponding calculation data items and the unique IDs of their calculators are converted into two-dimensional codes (QR codes) (by performing calculation), and images QA, QB, QC, and so on, of the two-dimensional codes (the QR codes) are displayed.

3-2. The teacher reads the images QA, QB, QC, and so on, of the two-dimensional codes (the QR codes) of the calculation data items and the unique IDs of the calculators displayed on the scientific calculators 10A, 10B, 10C, and so on, of the individual students "A", "B", "C", and so on, with the communication apparatus 20A with the camera.

3-3. Whenever reading each of the images QA, QB, QC, and so on, of the two-dimensional codes (the QR codes) displayed on the scientific calculators 10A, 10B, 10C, and so on, of the individual students "A", "B", "C", and so on, the teacher inputs the nickname of the corresponding student.

3-4. The teacher's communication apparatus 20A with the camera registers the input nicknames, in association with the content data items (the unique IDs of the calculators and the calculation data items) of the images QA, QB, QC, and so on, of the two-dimensional codes (the QR codes), for the individual students, respectively.

3-5. The teacher's communication apparatus 20A with the camera transmits the nickname, the unique calculator ID, and the calculation data items registered in association with each student in (3-4), together with the room ID (the group ID) registered in (2-3), to the compute server 30.

3-6. The compute server 30 registers the nickname, the unique calculator ID, and the calculation data items associated with each student and received from the teacher's communication apparatus 20A with the camera, in a memory area of the registration data memory 322 corresponding to the room ID (the group ID) received together with those information items, and integrates those information items.

4. If the teacher accesses the compute server 30 with the personal computer PC or the communication apparatus 20A with the camera, and designates the registered room ID (group ID), the compute server opens the integrated calculation data items registered in the memory area of the compute server 30 corresponding to the designated room (group), and displays an integration image of the integrated calculation data items associated with the individual students and including the nicknames.

As a result, it is possible to group the calculation data items of statistic calculation input by the scientific calculators 10A, 10B, 10C, and so on, of the individual students "A", "B", "C", and so on, according to the type of the corresponding calculation data items (for example, "HEIGHT/WEIGHT COMPARISON"), and manage the calculation data item groups as integrated data items. All of the teachers and the students can browse those integrated data items, thereby learning.

Now, specific operations of the computer system having the above described configuration will be described with reference to FIGS. 6 to 13.

First, the teacher accesses the HP address (calculation site) of the compute server 30, with the personal computer PC (or a communication apparatus 20 with the camera), and transmits a room ID (group ID) generation request to the compute server.

Figure 11A:
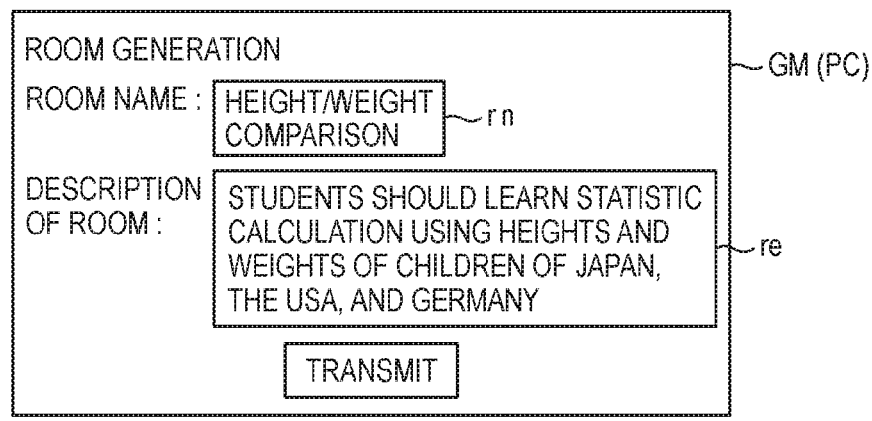
FIGS. 11A to 11D are views illustrating some of display operations of the computer system.

If the compute server 30 receives the room ID (group ID) generation request from the personal computer PC (or the communication apparatus) of the teacher ("Yes" in STEP S301), in STEP S302, the compute server transmits a room generation screen GM for generating a room (a group) according to a learning subject for a group of users (including the teacher and the students) (for example, a room (a group) of a subject according to a statistic calculation type) as shown in FIG. 11A, to the personal computer PC of the teacher.

The room generation screen GM has an area "rn" allowing a user to input a name for a room and an area "re" allowing a user to input a description of the room.

If the personal computer PC of the teacher receives the room generation screen GM from the compute server 30, and displays the room generation screen, the teacher inputs "HEIGHT/WEIGHT COMPARISON" in the area "rn" allowing a user to input a name for a room, and also inputs "STUDENTS SHOULD LEARN STATISTIC CALCULATION USING HEIGHTS AND WEIGHTS OF CHILDREN OF JAPAN, AMERICA, AND GERMANY" in the area "re" allowing a user to input a description of the room, and then operates a "TRANSMIT" button.

If the compute server 30 receives the room name "HEIGHT/WEIGHT COMPARISON" and the description of the room "STUDENTS SHOULD LEARN STATISTIC CALCULATION USING HEIGHTS AND WEIGHTS OF CHILDREN OF JAPAN, AMERICA, AND GERMANY" from the personal computer PC of the teacher (STEP S303), the compute server combines, for example, English capital and small letters and numbers, thereby generating a random 16-digit number (for example, "RK8n-1RvB-95Ez-ee2R") as the room ID (group ID) of the corresponding room. If the room ID (the group ID) generated at the that time matches any room ID (group ID) registered already, in STEP S304, the compute server regenerates a current room ID (group ID).

Subsequently, in STEP S305, the compute server transmits the generated room ID (group ID) to the teacher's personal computer PC (or the communication apparatus) which is the source of the current room generation request, thereby notifying the generated room ID.

Subsequently, in STEP S306, the compute server 30 reserves the dedicated data area 322A to the generated room ID (group ID), in the registration data memory 322, and registers the room ID (the group ID) "RK8n-1RvB-95Ez-ee2R", and the room name "HEIGHT/WEIGHT COMPARISON" and the description of the room "STUDENTS SHOULD LEARN STATISTIC CALCULATION USING HEIGHTS AND WEIGHTS OF CHILDREN OF JAPAN, AMERICA, AND GERMANY" input by the user, in the corresponding data area 322A, in association with one another.

Figure 11B:
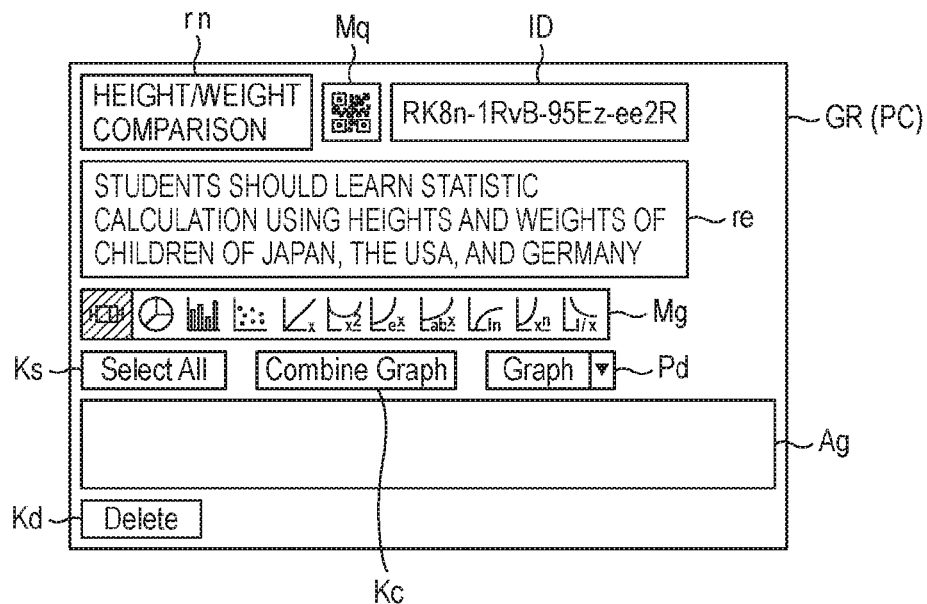

Subsequently, in STEP S307, the compute server 30 generates a room display screen GR including a list of the data items registered in the data area 322A for the generated room ID (group ID), as shown in FIG. 11B, and transmits the room display screen to the personal computer PC (or the communication apparatus 20) of the teacher. On the room display screen GR, a two-dimensional code (QR code) mark Mq is displayed together with the room name "HEIGHT/WEIGHT COMPARISON" ("rn"), the description of the room "STUDENTS SHOULD LEARN STATISTIC CALCULATION USING HEIGHTS AND WEIGHTS OF CHILDREN OF JAPAN, AMERICA, AND GERMANY" ("re"), and the room ID (the group ID) "RK8n-1RvB-95Ez-ee2R". Also, the room display screen GR includes a calculation data list area Ag (having no data in its initial state) for displaying a list of calculation data items registered and integrated with respect to the corresponding room, a "Select All" key Ks for designating all calculation data items, a "Combine Graph" key Kc for designating display of an integrated image of graphs of individual calculation data items, a pull-down menu pd for selecting a display form for each calculation data item, a graph menu Mg for selecting a graph type, and a "Delete" key Kd for designating deletion of registered data items.

If the user (the teacher) designates the two-dimensional code (QR code) mark Mq displayed on the room display screen GR (see FIG. 11B) received and displayed by the personal computer PC of the teacher in order to register the room ID (group ID) "RK8n-1RvB-95Ez-ee2R" of the corresponding room in the communication apparatus 20A (or 20B) with the camera (such as a smart phone) of the teacher (or another teacher which is the assistant class teacher), an instruction for converting the room ID (the group ID) into a two-dimensional code (a QR code) and displaying the two-dimensional code is transmitted to the compute server 30.

If the compute server 30 receives the instruction for converting the room ID (the group ID) into a two-dimensional code (a QR code) and displaying the two-dimensional code, from the personal computer PC of the teacher ("Yes" in STEP S308), in STEP S309, the compute server converts the room ID (the group ID) "RK8n-1RvB-95Ez-ee2R" into a two-dimensional code (a QR code), and generates an image QR of the two-dimensional code, and transmits the image QR to the personal computer PC of the teacher.

Then, the personal computer PC of the teacher receives and displays the image QR of the two-dimensional code (the QR code) of the room ID (the group ID) transmitted from the compute server 30.

Figure 11C:
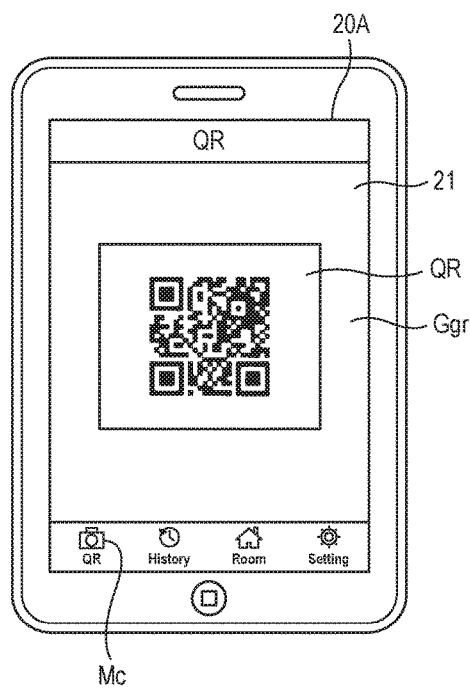

Thereafter, if the teacher activates the calculation data transmission/reception program (the dedicated QR application) downloaded from the compute server 30 to the teacher's communication apparatus 20A with the camera (a smart phone), as shown in FIG. 11C, a QR read screen Gqr is displayed on the display output unit 21.

If a camera mark Mc of the QR read screen Gqr displayed on the teacher's communication apparatus 20A with the camera (a smart phone) is touched ("Yes" in STEP S201), whereby the two-dimensional code (the QR code) of the room ID (the group ID) and the room name displayed on the personal computer PC of the teacher is imaged by the camera unit 26, in STEP S202, the communication apparatus analyzes the image QR of the two-dimensional code (the QR code), thereby acquiring the content data item of the two-dimensional code.

Figure 11D:
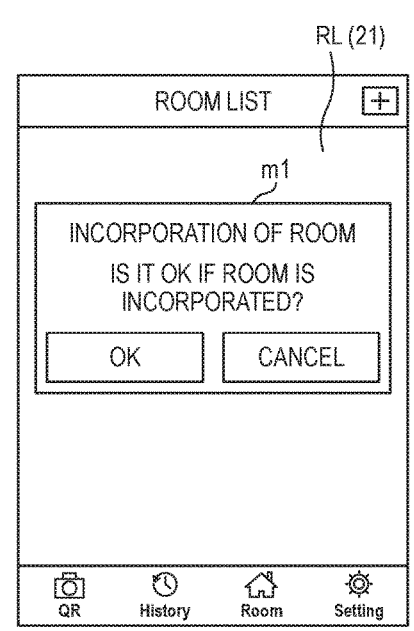

Then, if it is determined that the content data item of the two-dimensional code (the QR code) includes the 16-digit room ID (group ID) composed of English letters and numbers ("Yes" in STEP S203), as shown in FIG. 11D, a confirmation request m1 of incorporation of the room is displayed. In this state, if the user operates an "OK" key, with respect to the room ID (the group ID) "RK8n-1RvB-95Ez-ee2R", the smart phone transmits an inquiry about a room name corresponding to the corresponding room ID (the group ID) to the server by communication. If the server transmits the room name "HEIGHT/WEIGHT COMPARISON" corresponding to the corresponding room ID (the group ID), the smart phone receives the room name, and registers the corresponding room ID (group ID) "RK8n-1RvB-95Ez-ee2R" and the room name "HEIGHT/WEIGHT COMPARISON" in the data area 224a of the room ID memory area 224, in association with each other, in STEP S204.

Also, after the compute server 30 registers the room name "HEIGHT/WEIGHT COMPARISON" and the description of the room "STUDENTS SHOULD LEARN STATISTIC CALCULATION USING HEIGHTS AND WEIGHTS OF CHILDREN OF JAPAN, AMERICA, AND GERMANY" input with respect to the generated room ID (group ID) "RK8n-1RvB-95Ez-ee2R" by the user, in association with each other, in response to the room ID (group ID) generation request received from the personal computer PC (or the communication apparatus) of the teacher (STEPS S301 to S307), if the compute server 30 receives an instruction for transmitting the generated room ID (group ID) by mail, and the mail address of a transmission destination (the mail address of the communication apparatus 20A (20B) of the teacher "A" ("B")) from the personal computer PC (the communication apparatus 20) of the teacher ("Yes" in STEP S310), in STEP S311, the registered room ID (group ID) "RK8n-1RvB-95Ez-ee2R", the room name "HEIGHT/WEIGHT COMPARISON", and the description of the room "STUDENTS SHOULD LEARN STATISTIC CALCULATION USING HEIGHTS AND WEIGHTS OF CHILDREN OF JAPAN, AMERICA, AND GERMANY" are transmitted to the communication apparatus 20A (20B) corresponding to the received mail address by mail, and are registered in the communication apparatus 20A (20B).

In this way, the compute server 30 can reserve the data area 322A associated with the room ID (group ID) "RK8n-1RvB-95Ez-ee2R", the room name "HEIGHT/WEIGHT COMPARISON", and the description of the room "STUDENTS SHOULD LEARN STATISTIC CALCULATION USING HEIGHTS AND WEIGHTS OF CHILDREN OF JAPAN, AMERICA, AND GERMANY", in advance, and registers the corresponding room ID and the corresponding room name in the room ID memory area 224 of the communication apparatus 20A (20B) with the camera (the smart phone) of the teacher (the main class teacher "A" (an assistant class teacher "B") by the image QR of the two-dimensional code (the QR code) or mail transmission (STEPS S307 to S312 and STEPS S201 to S204).

If the room ID (the group ID) "RK8n-1RvB-95Ez-ee2R", the room name "HEIGHT/WEIGHT COMPARISON", and the description of the room "STUDENTS SHOULD LEARN STATISTIC CALCULATION USING HEIGHTS AND WEIGHTS OF CHILDREN OF JAPAN, AMERICA, AND GERMANY" are registered in the data area 224a of the room ID memory area 224 of the communication apparatus 20A (20B) with the camera (the smart phone) of the teacher "A" ("B") in the above described way, the room name (at this stage, only "HEIGHT/WEIGHT COMPARISON") registered in the room ID memory area 224 (224a) is read, and is displayed as a room list screen RL on the display output unit 21 as shown in FIG. 12D, in STEP S205. In this screen, the number of registered room names is one, and one room name is displayed on the list screen.

Now, a statistic calculation data generating process which is performed by each of the scientific calculators 10A, 10B, and 10C of the students "A", "B", and "C" will be described.

In the scientific calculator "A" of the student "A", if a "MODE" key is operated, a calculation function list menu (not shown) is displayed. If a statistic calculation function is selected in the displayed menu according to the calculation process of FIG. 6 (STEP S101), the operating mode of the scientific calculator "A" is set to a statistics mode, and a statistic calculation type list menu (not shown) for designating a statistic calculation type is displayed on the display output unit 12.

If the user designates a desired calculation type (here, linear regression of two-variable statistic calculation "A+BX") in the statistic calculation type list menu (STEP S102), a table data input screen (here, a two-variable input screen) Gi for inputting calculation element (table) data items (calculation object data items) of the designated calculation type (two-variable statistic calculation) is displayed on the display output unit 12 as shown in FIG. 12B.

If desired calculation element (table) data items (here, sample data items of the heights X and weights Y of Japan middle-school girls) are input on the table data input screen (the two-variable input screen) Gi, in STEP S103, the designated calculation type (two-variable statistic calculation) and the input element data items X and Y are stored in the input data area 143 of the memory 14.

In the state where statistic calculation (linear regression of two-variable statistic calculation) has been designated, and the calculation element data items X and Y (the heights X and weights Y of the Japan middle-school girls) have been input, if an operation on a "QR" key (a continuous operation on a "SHIFT" key and a "OPTN" key) of the key input unit 11 is performed (STEP S104), in STEP S105, data on various items such as the HP address of the compute server 30, the unique ID "xxxx1" of the corresponding calculator, the calculation function type (the statistic calculation function and the calculation type (linear regression of two-variable statistic calculation)) which is being applied to the calculation data items, function-based calculation data items (the calculation element data items (the heights X and weights Y of the Japan middle-school girls)), and setting information is converted into a two-dimensional code (a QR code), and an image QA of the two-dimensional code (the QR code) is displayed on the display output unit 12 as shown in FIG. 12C.

Also, although not particularly shown by the flow chart, the setting information is set by a continuous operation on the "SHIFT" key and the "MODE" key (that is, an operation on a "SETUP" key) of the key input unit 11, and is stored in the input data area 143. Examples of the setting information include settings of various modes such as an angle mode (a deg mode, a radian mode, or a gra mode), a rounding mode (a Norm mode in which an exponent is displayed, a Fix mode in which the number of digits after the decimal point is fixed, or a Sci mode in which the number of effective digits is designated), and a display mode (a LineIO mode in which one row is displayed or a MthIO mode in which a textbook is displayed).

After the calculation element data items (X, Y) for the designated type of statistic calculation (here, linear regression of two-variable statistic calculation) are input according to the processes of STEPS S101 to S103 described above, if the user operates an "=" key, thereby instructing execution of calculation ("Yes" in STEP S106), in STEP S107, the designated type of statistic calculation (linear regression of two-variable statistic calculation) is executed.

In the process of STEP S107 in which two-variable statistic calculation is executed, parameters "a" and "b" of a regression expression (y=a+bx), a correction coefficient "r", a determination coefficient "$r^2$", and a mean squared error MSe are calculated, on the basis of the calculation element data items (X, Y), and are displayed as statistic calculation result data on the display output unit 12 in STEP S108.

Thereafter, if the "QR" key of the key input unit 11 is operated in order to transmit calculation data items including the calculation result data items obtained by performing the designated type of statistic calculation (linear regression of two-variable statistic calculation) to the compute server 30 (STEP S109), in STEP S110, data on various items such as the HP address of the compute server 30, the unique ID "xxxx1" of the corresponding calculator, the calculation function type (the statistic calculation function and the calculation type (linear regression of two-variable statistic calculation)) which is being applied to the calculation data items, the result data items obtained by executing statistic calculation on the heights and weights of the Japan middle-school girls, and the setting information is converted into a two-dimensional code (a QR code), and the two-dimensional code (the QR code) is displayed on the display output unit 12.

Thereafter, if another calculation element data item is re-input, the process returns from STEP S111 to STEP S102; whereas if any data item is not re-input, the process returns to STEP S101.

If the teacher's communication apparatus 20A with the camera displays the room list screen RL as shown in FIG. 12A, in response to an operation of a room list display function, and the room name "HEIGHT/WEIGHT COMPARISON" R1 of the room list screen is touched, thereby being selected ("Yes" in STEP S206), a room operation menu Ms1, which is composed of three selection items, that is, (A) "OPEN ROOM BY BROWSER APPLICATION", (B) "TRANSMIT URL OF ROOM BY MAIL", and (C) "READ QR CODE (CALCULATION DATA) TO BE ADDED TO ROOM", is displayed in STEP S207.

If the selection item (C) "READ QR CODE (CALCULATION DATA) TO BE ADDED TO ROOM" of the room operation menu Ms1 is touched, thereby being selected in order to read the image QA of the two-dimensional code (the QR code) displayed on the scientific calculator "A" of the student "A" ("(C)" in STEP S208), the QR read screen Gqr is displayed on the display output unit 21 as shown in FIG. 12E, and the communication apparatus stands by until the two-dimensional code (the QR code) is read.

Figure 7:
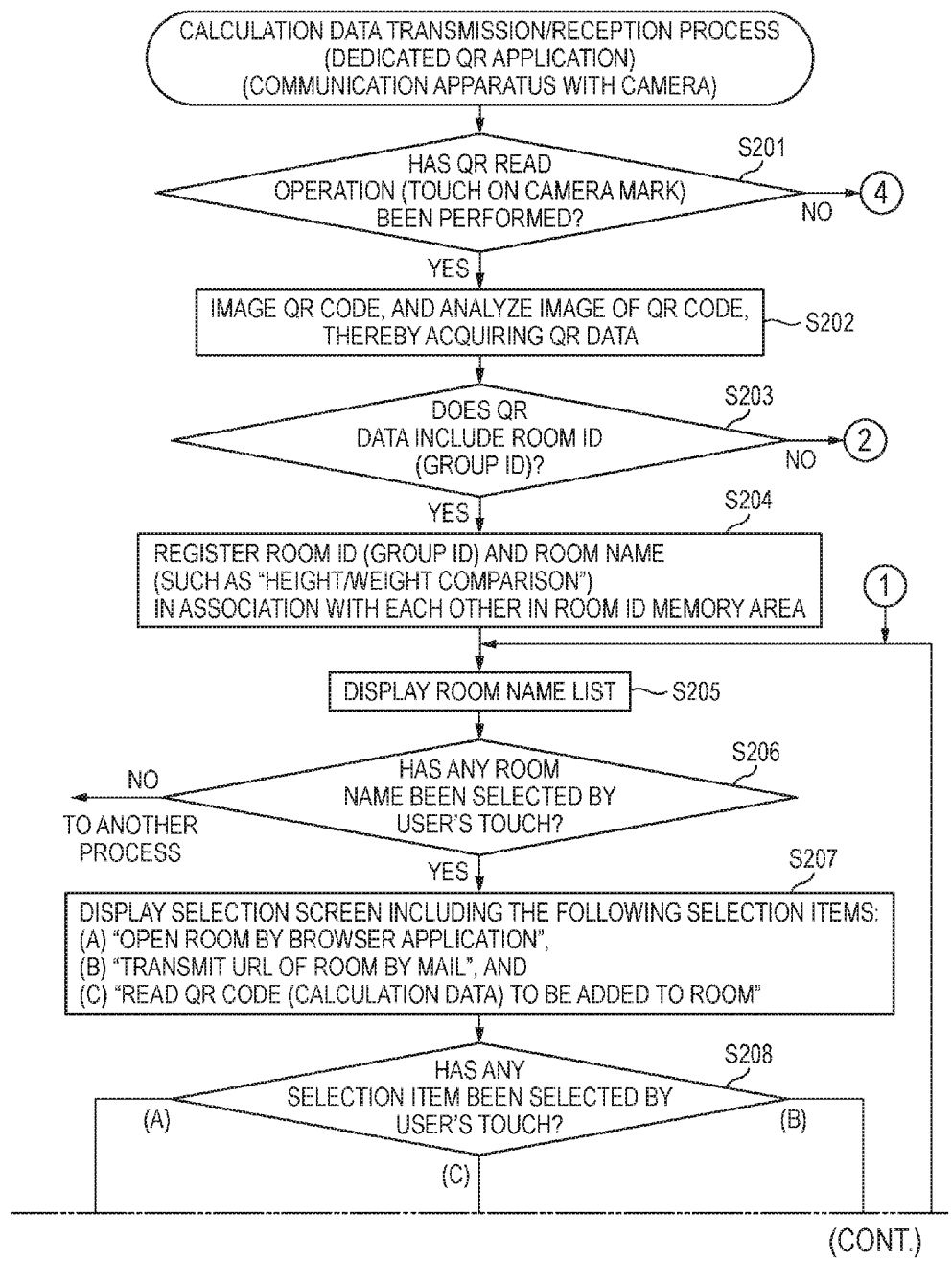
FIG. 7 is a flow chart illustrating a part of a calculation data transmission/reception process of the communication apparatus 20 with the camera.

Thereafter, if the two-dimensional code (the QR code) displayed on the display output unit 12 as shown in FIG. 12C after calculation was executed by the statistic calculation function of the scientific calculator "A" of the student "A" (after inputting of the calculation element data items (STEPS S101 to S105)) is imaged as shown in FIG. 12E with the communication apparatus 20A with the camera (the smart phone) of the teacher "A" by touching the camera mark Mc, in STEP S210, according to the calculation data transmission/reception process of FIG. 7, the two-dimensional code (the QR code) QA is analyzed, whereby data on various items such as the HP address of the compute server 30, the unique ID "xxxx1" of the scientific calculator 10A, the calculation function type (the statistic calculation function and the calculation type (linear regression of two-variable statistic calculation)), the calculation data items (the heights and weights of the Japan middle-school girls) (or the calculation result data items), and the setting information is obtained as the content data item of the two-dimensional code.

In this case, if it is determined that the content data item (the QR data item) acquired by imaging the two-dimensional code (the QR code) QA is a calculation data item ("Yes" in STEP S211), in STEP S212, the communication apparatus determines whether a nickname associated with the unique ID "xxxx1" of the scientific calculator 10A included in the content data item (the QR data item) of the two-dimensional code (QR code) QA has been registered in the nickname memory area 223 of the memory 23.

Figure 13A:
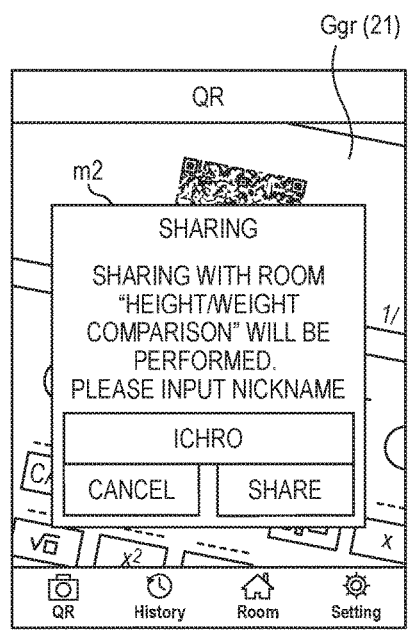
FIGS. 13A to 13C are views illustrating others of display operations of the computer system.

In the initial state, the communication apparatus determines that a nickname associated with the unique ID "xxxx1" of the scientific calculator 10A has not been registered ("NO" in STEP S212), and displays a nickname input request m2 (SHARING WITH ROOM "HEIGHT/WEIGHT COMPARISON" WILL BE PERFORMED. PLEASE INPUT NICKNAME.) urging the teacher to input the nickname of the user (the student "A") of the scientific calculator 10A which is the source of the acquired the calculation data items, as shown in FIG. 13A.

According to the nickname input request m2, if the nickname "ICHRO" of the student "A" is input, and a "SHARE" key included in the nickname input request m2 is touched, in STEP S213, the unique ID "xxxx1" of the calculator acquired from the scientific calculator 10A and the nickname "ICHRO" input with respect to the student "A are registered in the data area 223a of the nickname memory area 223 in association with each other.

Meanwhile, in a case of determining that a nickname associated with the unique ID "xxxx1" acquired from the scientific calculator 10A has been registered in the nickname memory area 223 of the memory 23 ("Yes" in STEP S212), in STEP S214, a nickname input request m2 already including the registered nickname is displayed.

Figure 13B:
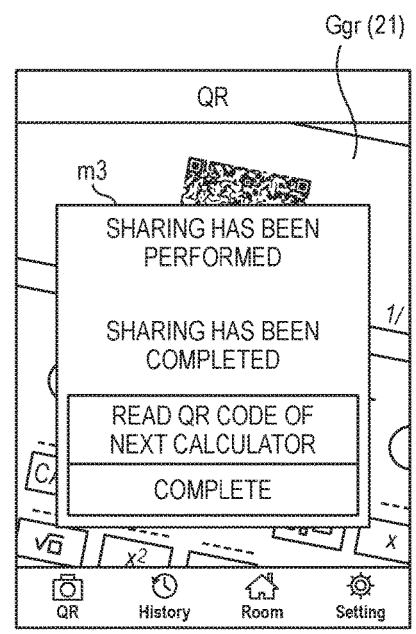
Figure 13C:
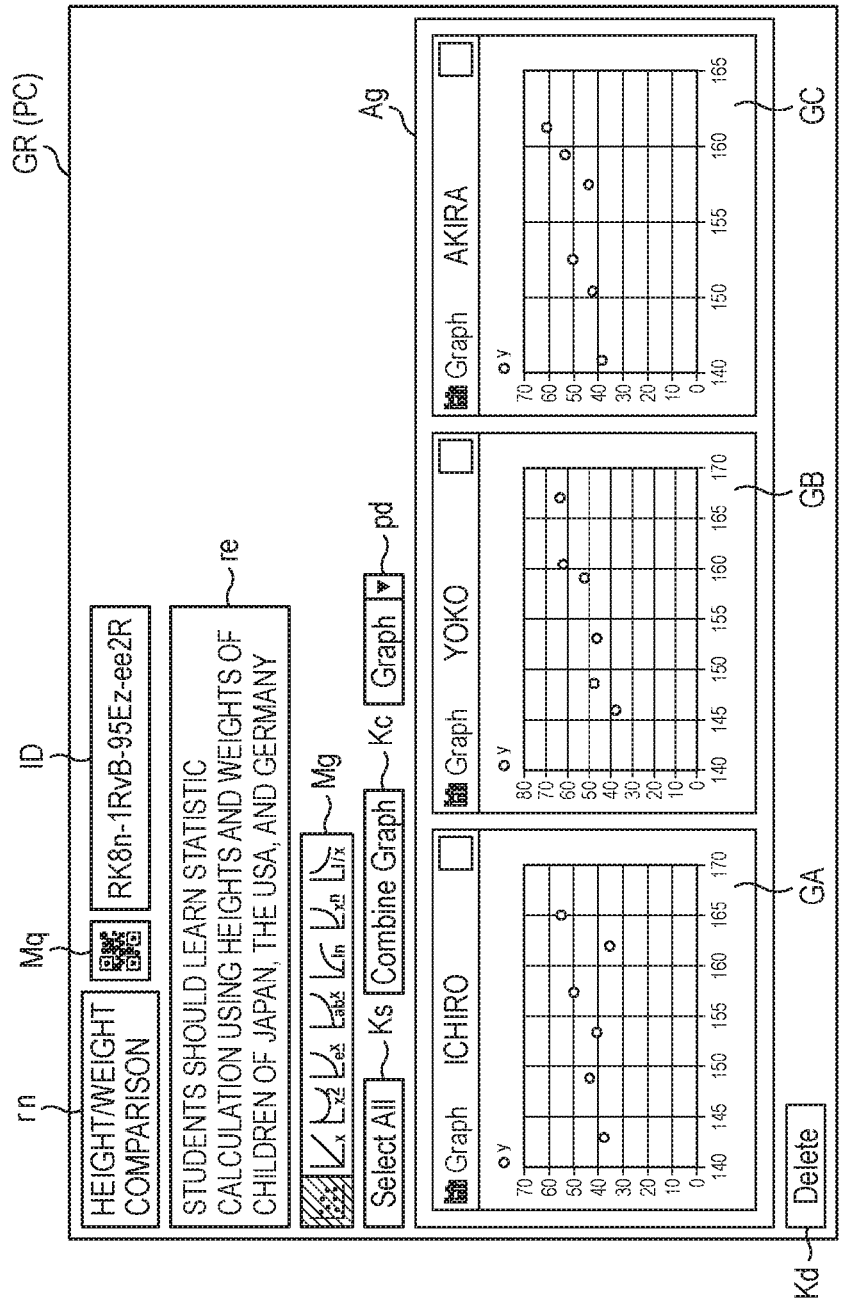

Subsequently, data on various items such as the HP address of the compute server 30, the unique ID "xxxx1" of the scientific calculator 10A, the calculation function type (the statistic calculation function and the calculation type (linear regression of two-variable statistic calculation)), the calculation data items (the heights and weights of the Japan middle-school girls) (or the calculation result data items), and the setting information acquired as the content data item (the QR data item) of the two-dimensional code (the QR code) QA from the scientific calculator 10A, the room ID (group ID) "RK8n-1RvB-95Ez-ee2R" of the room "HEIGHT/WEIGHT COMPARISON" selected as a sharing destination in STEP S206, and "ICHRO" input as the nickname of the student "A" are transmitted to the compute server 30, and a sharing completion confirmation request m3 is displayed as shown in FIG. 13B in STEP S215.

Subsequently, if a "READ QR CODE OF NEXT CALCULATOR" key included in the sharing completion confirmation request m3 is touched in order to image a two-dimensional code (a QR code) QB, displayed on the scientific calculator 10B of the student "B" by inputting sample data items of the heights X and weights Y of American middle-school girls and processing the sample data items according to the calculation process (see FIG. 6) similarly in the scientific calculator 10A of the student "A", with the communication apparatus 20A with the camera of the teacher "A" ("Yes" in STEP S216), the process of STEP S210 and the subsequent processes are repeated.

In other words, the teacher "A" images the two-dimensional code (the QR code) displayed on the scientific calculator 10B of the student "B", with the communication apparatus 20A with the camera, whereby the nickname "YOKO" is registered in the data area 223b of the nickname memory area 223 in association with the unique ID "xxxx2" of the scientific calculator 10B (STEPS S210 to S213).

Subsequently, in STEP S215, data on various items such as the unique ID "xxxx2" of the scientific calculator 10B, the calculation function type (the statistic calculation function and the calculation type (linear regression of two-variable statistic calculation), the calculation data items (the heights X and weights Y of the American middle-school girls) (or the calculation result data items), and the setting information acquired as the content data item (QR data item) of the two-dimensional code (the QR code) QB from the scientific calculator 10B, the room ID (group ID) "RK8n-1RvB-95Ez-ee2R" of the room "HEIGHT/WEIGHT COMPARISON", and the nickname "YOKO" of the student "B" are transmitted to the compute server 30.

Further, if the teacher images a two-dimensional code (a QR code) QC, displayed on the scientific calculator 10C of the student "C" by inputting sample data items of the heights X and weights Y of German middle-school girls and processing the sample data items according to the calculation process (see FIG. 6) similarly in the scientific calculators 10A and 10B of the students "A" and "B", with the communication apparatus 20 with the camera (the smart phone), the nickname "AKIRA" is registered in the nickname memory area 223 in association with the unique ID "xxxx3" of the scientific calculator 10C (STEPS S210 to S213 (STEP S214)).

Also, in the present embodiment, the teacher "B" (the assistant class teacher) images the two-dimensional code (the QR code) QC displayed according to the calculation process of the scientific calculator 10C of the student "C", with the communication apparatus 20B with the camera (the smart phone), and according to the processes of STEPS S210 to S215 as described above, data on various items such as the unique ID "xxxx3" of the scientific calculator 10C, the calculation function type (the statistic calculation function and the calculation type (linear regression of two-variable statistic calculation), the calculation object data items (the heights X and weights Y of the German middle-school girls) (or the calculation result data items), and the setting information acquired as the content data item (QR data item) of the two-dimensional code, the room ID (group ID) "RK8n-1RvB-95Ez-ee2R" of the room "HEIGHT/WEIGHT COMPARISON", and the nickname "AKIRA" of the student "C" are transmitted to the compute server 30.

When the room operation menu Ms1 has been displayed with respect to the communication apparatus 20B with the camera of the teacher "B" on the communication apparatus 20A with the camera (the smart phone) of the teacher "A" as shown in FIG. 12D by touching the room name "HEIGHT/ WEIGHT COMPARISON" R1, if the selection item (B) "TRANSMIT URL OF ROOM BY MAIL" is touched (STEPS S205 to S207, and "(B)" in STEP S208), the mail application is activated, and the room ID (group ID) "RK8n-1RvB-95Ez-ee2R" and the room name "HEIGHT/WEIGHT COMPARISON" registered in the room ID memory area 224 (224a) is transmitted to the mail address (the mail address of the communication apparatus 20B with the camera of the teacher "B") designated by the user, whereby it is possible to register them therein (STEP S217).

If acquiring of the images QA, QB, and QC of the two-dimensional codes (the QR codes) displayed on the scientific calculators 10A, 10B, and 10C of the students "A", "B", and "C" with the communication apparatus 20A (20B)

with the camera (the smart phone) of the teacher "A" ("B") finishes, and the teacher touches a "COMPLETION" key included in the sharing completion confirmation request m3 (see FIG. 13B) ("Yes" in STEP S225), the calculation data transmission/reception process (the dedicated QR application) finishes.

Also, the data on various items such as the unique calculator ID, the calculation function type (the statistic calculation function and the calculation type), the calculation object data items (or the calculation result data items), and the setting information which is acquired from each scientific calculator 10 by the communication apparatus 20 with the camera (the smart phone) of a teacher is acquired by imaging and analyzing a two-dimensional code (a QR code) obtained by converting the corresponding data in the corresponding scientific calculator 10; however, the corresponding data may be acquired by near field communication between the wireless communication unit 16 of the corresponding scientific calculator 10 and the wireless communication unit 28 of the communication apparatus 20 of the teacher.

Subsequently, if the compute server 30 receives the data on various items such as the unique calculator ID, the calculation function type (the statistic calculation function and the calculation type), the calculation object data items (or the calculation result data items), and the setting information transmitted, as the content data item of each of the two-dimensional codes (the QR codes) QA, QB, and QC corresponding to the scientific calculators 10A, 10B, and 10C of the students "A", "B", and "C", from the communication apparatuses 20A and 20B with the cameras of the teachers "A" and "B", in association with the room ID (group ID) "RK8n-1RvB-95Ez-ee2R" of the room "HEIGHT/WEIGHT COMPARISON" and the nicknames "ICHRO", "YOKO", and "AKIRA" (STEP S313), in STEP S314, the compute server saves the content data items (QR data items) of the two-dimensional codes (the QR codes) QA, QB, and QC, and the nicknames, in the dedicated data area 322A to the received room ID (group ID) "RK8n-1RvB-95Ez-ee2R", in association with the students "A", "B", and "C", respectively.

In other words, the compute server 30 saves the nickname "ICHRO" and the calculation data items such as the calculation function type (the statistic calculation function and the calculation type (linear regression of two-variable statistic calculation), and the calculation object data items (the heights X and weights Y of the Japan middle-school girls) (or calculation result data items) associated with the student "A", the nickname "YOKO" and the calculation data items such as the calculation function type (the statistic calculation function and the calculation type (linear regression of two-variable statistic calculation), and the calculation object data items (the heights X and weights Y of the American middle-school girls) (or calculation result data items) associated with the student "B", and the nickname "AKIRA" and the calculation data items such as the calculation function type (the statistic calculation function and the calculation type (linear regression of two-variable statistic calculation), and the calculation object data items (the heights X and weights Y of the German middle-school girls) (or calculation result data items) associated with the student "C", in the registration data memory 322.

Thereafter, if the teacher re-opens the room display screen GR of the room "HEIGHT/WEIGHT COMPARISON" as shown in FIG. 11B on the personal computer PC (the communication apparatus 20), the integrated calculation data items of each of the students "A", "B", and "C" saved in the data area (associated with the room name "HEIGHT/WEIGHT COMPARISON") 322A of the compute server 30 corresponding to the room ID (group ID) "RK8n-1RvB-95Ez-ee2R" are calculated according to the statistics function type (the statistic calculation function and the calculation type (linear regression of two-variable stack designation variable) ("Yes" in STEP S316, and STEP S317). Then, image integration data Ag which is a list including the nicknames "ICHRO", "YOKO", and "AKIRA" and graph images (scatter diagrams as defaults) GA, GB, and GC associated with each other with respect to the individual calculation data items is generated, and an updated room display screen GR including the image integration data Ag is transmitted to and displayed on the personal computer PC (the communication apparatus 20) of the teacher (STEP S317).

Also, in the communication apparatus 20 (the personal computer PC) of the teacher, for example, if it is determined that the house mark "Room" displayed on the QR read screen Gqr (see FIG. 11C) has been touched, whereby a room list display operation has been performed ("Yes" in STEP S218), in STEP S205, each room name (here, only the room name "HEIGHT/WEIGHT COMPARISON") registered in the room ID memory area 224 (224a) is read out, and displayed as the room list screen RL (see FIG. 12A) on the display output unit 21.

Meanwhile, when the room name "HEIGHT/WEIGHT COMPARISON" R1 of the room list screen RL has been selected, whereby the room operation menu Ms1 (see FIG. 12D) has been displayed ("Yes" in STEP S206, and STEP S207), if the selection item (A) "OPEN ROOM BY BROWSER APPLICATION" is touched, thereby being selected ("(A)" in STEP S208), in STEP S209, the browser application is activated, and the room ID (group ID) "RK8n-1RvB-95Ez-ee2R" of the selected room name "HEIGHT/WEIGHT COMPARISON" R1 is designated, and a request for opening the corresponding room is transmitted to the compute server 30.

Then, similarly in the case where the teacher re-opens the room display screen GR on the personal computer PC, the compute server 30 calculates the calculation data items of each of the students "A", "B", and "C" corresponding to the room ID (group ID) "RK8n-1RvB-95Ez-ee2R", according to a corresponding calculation function type ("Yes" in STEP S316, and STEP S317). Then, the image integration data Ag which is a list including the nicknames "ICHRO", "YOKO", and "AKIRA" and the graph images GA, GB, and GC associated with each other with respect to the individual calculation data items is generated, and the room display screen GR including the image integration data Ag is transmitted to and displayed on the communication apparatus 20 (the personal computer PC) of the teacher (STEP S317).

FIG. 14 is a view illustrating other display operations of the computer system.

Similarly in the case of reserving the data area 322A for the room ID (group ID) "RK8n-1RvB-95Ez-ee2R" corresponding to the room name "HEIGHT/WEIGHT COMPARISON", the teacher accesses the HP address (calculation site) of the compute server 30 with the personal computer PC (the communication apparatus 20), and reserves a data area 322B for a room ID (group ID) "AKBa-22C5-Za4b-ff23" corresponding to a new room name "PROBABILITY LEARNING USING DICE" (STEPS S301 to S306).

Subsequently, the room ID (group ID) "AKBa-22C5-Za4b-ff23" and room name "PROBABILITY LEARNING USING DICE" of the room newly generated in the compute server 30 are registered in the data area 224b of the room ID memory area 224 of the communication apparatus 20 with the camera (the smart phone) of the teacher by reading an image QR of a two-dimensional code (a QR code) as described above or by mail transmission (STEPS S307 to S312 and STEPS S201 to S204).

In the scientific calculator (information display apparatus) 10A of the student "A", if a statistic calculation function is selected as described above (STEP S101), and the calculation type thereof (here, one-variable statistic calculation) is designated (STEP S102), a table data input screen (here, a one-variable input screen) Gi for inputting calculation element (table) data items of the designated calculation type (one-variable statistic calculation) is displayed on the display output unit 12.

If desired calculation element (table) data items (here, sample data items on the numbers X of spots obtained by casting a dice six times) are input on the table data input screen (one-variable input screen) Gi, in STEP S103, the designated calculation type (one-variable statistic calculation) and the input element data items X are stored in the input data area 143 of the memory 14.

Figure 14A:
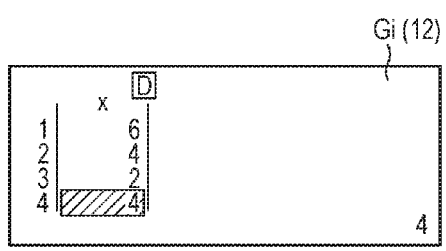
FIGS. 14A to 14E are views illustrating others of the display operations of the computer system.
Figure 14B:
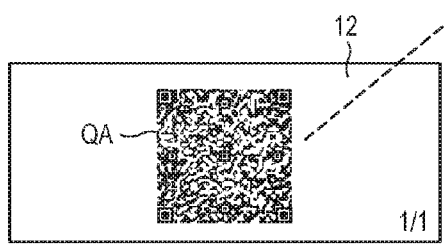

In this state where the calculation element data items X (the numbers X of spots obtained by casting the dice six times) for the designated statistic calculation (one-variable statistic calculation) have been input, if the "QR" key of the key input unit 11 is operated, similarly in the case of the room "HEIGHT/WEIGHT COMPARISON", in order to the transmit those calculation data items to the compute server 30 (STEP S104), in STEP S105, bar code content data on various items such as the HP address of the compute server 30, the unique ID "xxxx1" of the corresponding calculator, the calculation function type (the statistic calculation function and the calculation type (one-variable statistic calculation)) which is being applied to the calculation data items, and setting information is converted into a two-dimensional code (a QR code), and an image QA of the corresponding two-dimensional code (QR code) is displayed as shown in FIG. 14B on the display output unit 12.

Figure 14D:
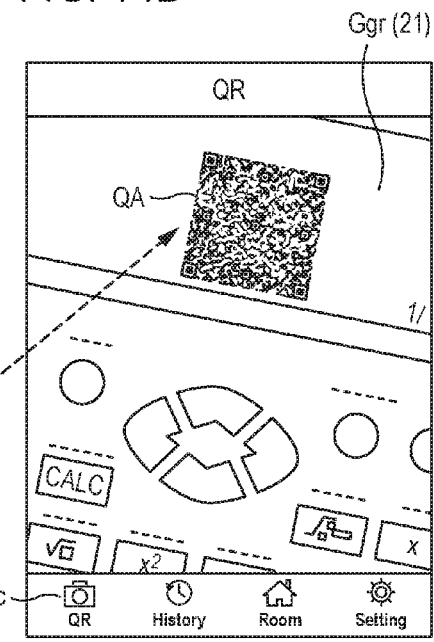
Figure 14C:
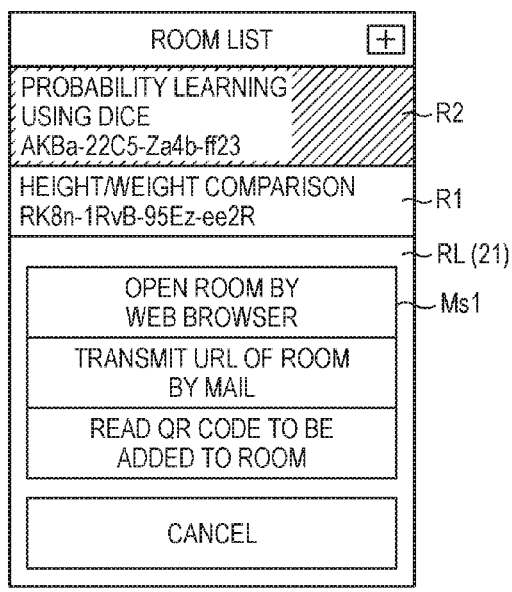

Thereafter, if the room name "PROBABILITY LEARNING USING DICE" R2 of the room list screen RL is selected by the communication apparatus 20 with the camera of the teacher, whereby the room operation menu Ms1 is displayed as shown in FIG. 14C (STEPS S205 to S207). Then, if the selection item (C) "READ QR CODE (CALCULATION DATA) TO BE ADDED TO ROOM" is selected as described above ("(C)" in STEP S208), the QR read screen Gqr is displayed as shown in FIG. 14D on the display output unit 21.

Thereafter, if the two-dimensional code (the QR code) QA displayed as shown in FIG. 14B on the scientific calculator 10A of the student "A" is imaged as shown in FIG. 14D by the communication apparatus 20 with the camera (the smart phone) of the teacher, in STEP S210, the two-dimensional code (the QR code) QA is analyzed, whereby data on various items such as the HP address of the compute server 30, the unique ID "xxxx1" of the calculator, the calculation function type (the statistic calculation function and the calculation type (one-variable statistic calculation)) which is being applied, the calculation data items (the calculation element data items (the numbers X of spots obtained by casting the dice six times)), and the setting information is obtained as the content data item of the two-dimensional code.

Figure 14E:
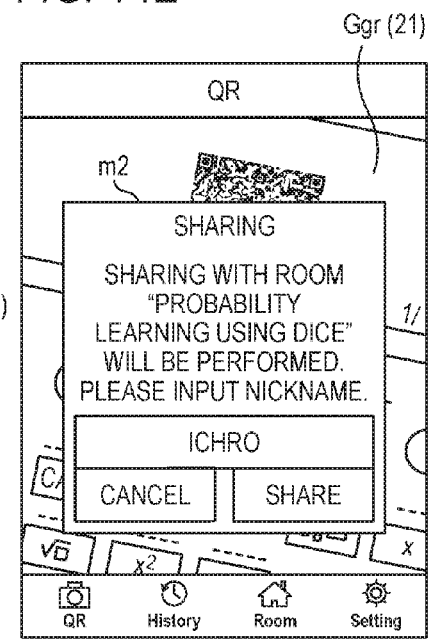

In this case, since it is determined that the nickname "ICHRO" associated with the unique ID "xxxx1" of the scientific calculator 10A included in the content data item (the QR data item) of the image QA of the two-dimensional code (the QR code) has been registered in the nickname memory area 223 of the memory 23 (STEP S211, and "Yes" in STEP S212), in STEP S214, a nickname input request m2 already including the registered nickname "ICHRO" is displayed as shown in FIG. 14E.

Thereafter, if the "SHARE" key included in the input request m2 is touched, in STEP S215, the data on various items such as the unique ID "xxxx1" of the corresponding calculator, the calculation function type (the statistic calculation function and the calculation type (one-variable statistic calculation)) which is being applied, the calculation data items (the calculation element data items (the numbers X of spots obtained by casting the dice six times)), and the setting information acquired as the content data item (the QR data item) of the two-dimensional code (the QR code) QA from the scientific calculator 10A, the room ID (group ID) "AKBa-22C5-Za4b-ff23" of the new room "PROBABILITY LEARNING USING DICE" selected and designated as the sharing destination in STEP S206, and the nickname "ICHRO" of the student "A" are transmitted to the compute server 30.

Thereafter, similarly in the scientific calculator 10A of the student "A", even in the scientific calculator 10B of the student "B" or the scientific calculator 10C of the student "C", the unique ID of the corresponding calculator and calculation data items representing the numbers of spots obtained by casting a dice six times and input according to the statistic calculation process are converted into a two-dimensional code (a QR code), and the two-dimensional code is displayed as an image QB or QC (STEPS S101 to S105), and the two-dimensional code is imaged by the communication apparatus 20 with the camera of the teacher, whereby it is possible to transmit the unique ID of the corresponding calculator, the calculation data items, the room ID (group ID) "AKBa-22C5-Za4b-ff23" of the new room "PROBABILITY LEARNING USING DICE", and the nickname "YOKO" or "AKIRA" of the corresponding student in association with one another to the compute server 30 (STEPS S210 to S216).

As a result, the compute server 30 receives the unique ID of each calculator, the calculation data items, and the nickname received from the communication apparatus 20 with the camera (the smart phone) of the teacher, and registers the received information in association with a corresponding student "A", "B", or "C" in the data area 322B (corresponding to the room name "PROBABILITY LEARNING USING DICE"), dedicated to the room ID (group ID) "AKBa-22C5-Za4b-ff23", of the registration data memory 322 ("Yes" in STEP S313, and STEP S314).

In this case, if the teacher selects the room name "PROBABILITY LEARNING USING DICE" R2 on the room list screen RL (see FIG. 14C) displayed on the communication apparatus 20 with the camera (the personal computer PC) of the teacher according to the calculation data transmission/reception process, and selects the selection item (A) "OPEN ROOM BY BROWSER APPLICATION" in the room operation menu Ms1 ("Yes" in STEP S218, STEPS S205 to S207, "Yes" in STEP S208, and STEP S209), similarly in the case where the room display screen GR (see FIG. 13C) of the room "HEIGHT/WEIGHT COMPARISON" has been displayed, it is possible to generate image integration data Ag which is a list including the nicknames "ICHRO", "YOKO", and "AKIRA" and graph images of the calculation data items associated with each other, from the calculation data items of the individual students "A", "B", and "C" stored in the data area (332B) for the room "PROB- ABILITY LEARNING USING DICE" selected by the compute server 30, and display a room display screen GR including the image integration data Ag on the communication apparatus 20 (the personal computer PC) of the teacher (STEPS S316 to S317).

Therefore, it is possible to manage and display the calculation data items processed according to statistic calculation by each of the scientific calculators 10A, 10B, 10C, and so on, of the students "A", "B", "C", and so on, as integrated data items related to each of different rooms depending on subjects ("HEIGHT/WEIGHT COMPARISON" and "PROBABILITY LEARNING USING DICE").

Further, it is possible to add the nicknames of the students "A", "B", "C", and so on, to the calculation data items of the scientific calculators 10A, 10B, 10C, and so on, integrated as integrated data items, respectively, and to manage and display the calculation data items with the nicknames.

In this case, the nicknames of the individual students "A", "B", "C", and so on, are registered and managed in the communication apparatus 20 (the personal computer PC) of the teacher, in association with the unique calculator IDs of the scientific calculators 10A, 10B, 10C, and so on. Also, the data items of each room (including the nickname and calculation data items of each student) saved in the registration data memory 322 of the compute server 30 can be deleted at a user's desired timing by the "Delete" key Kd provided on the room display screen GR, and can also be automatically deleted, regularly according to the learning curriculum, for example, weekly or monthly. Therefore, it is possible to prevent the personal information such as the nicknames saved in the compute server 30 from being abused by third parties.

Hereinafter, display operations of the computer system will be described with reference to FIGS. 15 and 16. As shown in FIGS. 11A to 12A, according to operations of the teacher on the personal computer PC (the communication apparatus 20), the compute server 30 reserves the dedicated data area (corresponding to the room name "HEIGHT/WEIGHT COMPARISON") 322A to the room ID (the group ID) "RK8n-1RvB-95Ez-ee2R", in the registration data memory 322, and registers the room ID (group ID) "RK8n-1RvB-95Ez-ee2R" and room name "HEIGHT/WEIGHT COMPARISON" of the generated room, in the room ID memory area 224 of the personal computer PC (the communication apparatus 20) of the teacher (STEPS S201 to S205).

Thereafter, if the sample data items of the heights and weights of the Japan middle-school girls are input as calculation object data items for statistic calculation by the scientific calculator 10A of the student "A" as shown in FIG. 12B, a two-dimensional code (QR code) QA including information on the unique ID "xxxx1" of the corresponding calculator, the calculation function type (the statistic calculation function and the calculation type (linear regression of two-variable stack designation variable), and the calculation object data items is displayed as shown in FIG. 12C (STEPS S101 to S105).

Figure 15A:
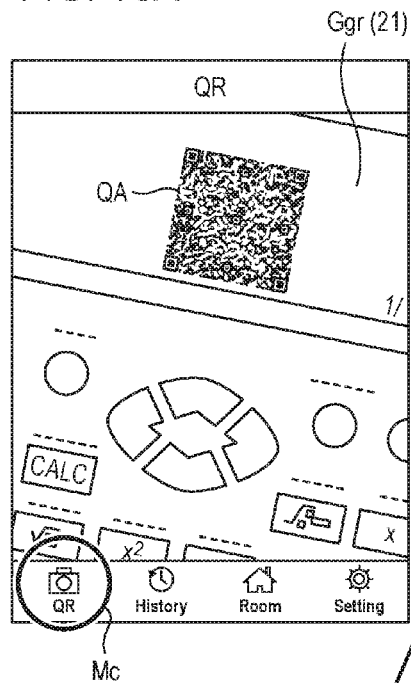
FIGS. 15A to 15D are views illustrating others of the display operations of the computer system.

Thereafter, if the QR read screen Gqr is displayed on the communication apparatus 20 with the camera (the smart phone) as shown in FIG. 15A, and the camera mark Mc is touched, the two-dimensional code (QR code) QA displayed on the scientific calculator 10A is imaged (STEPS S201 and S202).

Figure 15B:
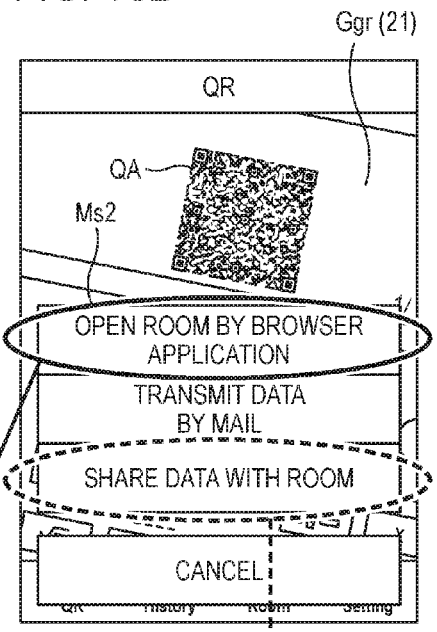
Figure 15C:
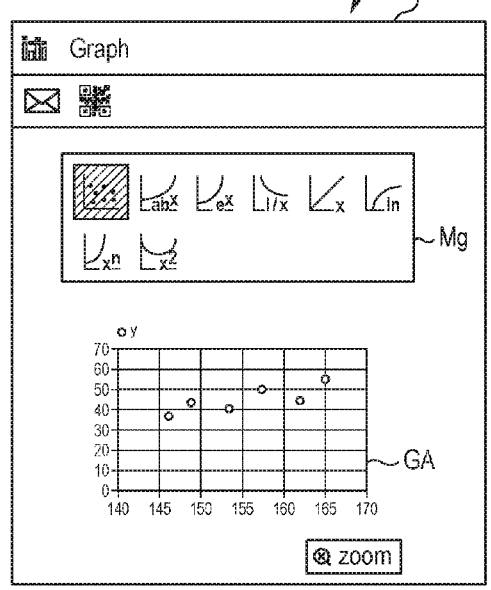

Then, if the communication apparatus 20 with the camera (the smart phone) analyzes the image of the two-dimensional code (the QR code) QA, thereby obtaining the content data item (the QR data item), and determines that the content data item is a calculation data item including the calculation function type and the calculation object data items ("Yes" in STEP S219), in STEP S220, a data operation menu Ms2 composed of three selection items, that is, (X) "OPEN DATA BY BROWSER APPLICATION", (Y) "TRANSMIT DATA BY MAIL", and (Z) "SHARE DATA WITH ROOM" is displayed as shown in FIG. 15B.

If the selection item (X) "OPEN DATA BY BROWSER APPLICATION" is touched in the data operation menu Ms2, thereby being selected ("(X)" in STEP S221), in STEP S226, data on the unique ID "xxxx1" of the corresponding calculator, the calculation function type (the statistic calculation function and the calculation type (linear regression of two-variable stack designation variable)), and the calculation object data items (the sample data items on the heights and weights of the Japan middle-school girls) is transmitted as the content data item (QR data item) of the two-dimensional code (the QR code) QA to the compute server 30.

If the compute server 30 receives the data on the unique ID "xxxx1" of the corresponding calculator, the calculation function type (the statistic calculation function and the calculation type (linear regression of two-variable stack designation variable)), and the calculation object data items (the sample data items on the heights and weights of the Japan middle-school girls), as the content data item (the QR data item) of the two-dimensional code (the QR code) QA corresponding to the scientific calculator 10A of the student "A", without any room ID (group ID), from the communication apparatus 20 with the camera (STEP S319), in STEP S320, the content data item (the QR data item) of the two-dimensional code (the QR code) QA is temporarily saved in the memory 32.

Then, if it is determined that the content data item (the QR data item) of the two-dimensional code (the QR code) QA temporarily saved in the memory 32 is a data item for the statistic calculation function ("Yes" in STEP S321), in STEP S322, whether the content data item is a two-dimensional code content data item (QR data item) including even calculation object data items (X, Y) or a two-dimensional code content data item (QR data item) including even calculation result data items is determined.

If it is determined that the content data item (the QR data item) of the two-dimensional code (the QR code) QA for the statistic calculation function temporarily saved is a two-dimensional code content data item (QR data item) including even calculation object data items (X, Y) ("Yes" in STEP S322), in STEP S323, statistic calculation corresponding to the calculation function type (the statistic calculation function and the calculation type (linear regression of two-variable stack designation variable)) of the two-dimensional code content data item (QR data item) is executed on the calculation object data items (X, Y), whereby an calculation result image data item GS (see FIG. 15C) including the calculation results and a graph data item (a scatter diagram) GA is generated, and the generated data item is transmitted to and displayed on the communication apparatus 20 with the camera which is the transmission source of the two-dimensional code content data item (QR data item).

Also, even in the calculation result image data item GS (see FIG. 15C), the graph menu Mg for selecting a graph type is included, and the graph type of the graph menu Mg is set to a default "SCATTER DIAGRAM".

Meanwhile, if it is determined that the content data item (the QR data item) of the two-dimensional code (the QR code) QA for the statistic calculation function temporarily saved is a two-dimensional code content data item (QR data item) including even calculation result data items ("No" in STEP S322), in STEP S324, a graph image corresponding to the calculation result data items is generated on the basis of the two-dimensional code content data item (QR data item), and is transmitted to and displayed on the communication apparatus 20 with the camera which is the data transmission source.

Figure 15D:
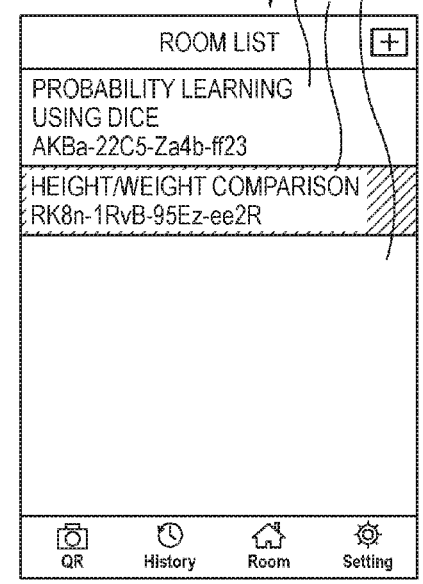

Also, after it is determined that the content data item (the QR data item) of the image of the two-dimensional code is a calculation data item, if the data operation menu Ms2 is displayed as shown in FIG. 15B on the communication apparatus 20 with the camera (the smart phone), and the selection item (Z) "SHARE DATA WITH ROOM" is touched, thereby being selected ("(Z)" in STEP S221), in STEP S222, room names registered in the room ID memory area 224 (here, the room names "HEIGHT/WEIGHT COMPARISON" and "PROBABILITY LEARNING USING DICE") are read out, and are displayed as the room list screen RL on the display output unit 21 as shown in FIG. 15D.

Figure 16A:
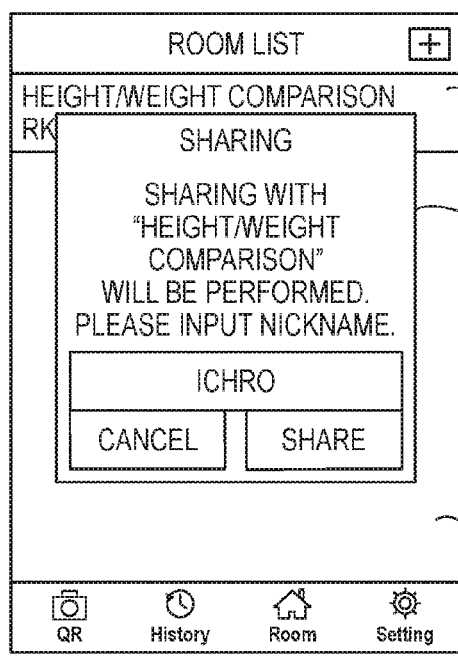
FIGS. 16A to 16C are views illustrating others of the display operations of the computer system.

Then, if the room name "HEIGHT/WEIGHT COMPARISON" R1 of the room list screen RL is touched, thereby being selected ("Yes" in STEP S223), in STEP S212, the communication apparatus determines whether any nickname associated with the unique ID "xxxx1" of the scientific calculator 10A included in the two-dimensional code content data item (QR data item) has been registered in the nickname memory area 223 of the memory 23. If it is determined that any nickname has not been registered (new registration is required) ("No" in STEP S212), the nickname input request m2 urging the teacher to input a nickname for the user (the student "A") of the scientific calculator 10A is displayed as shown in FIG. 16A.

According to the nickname input request m2, if the nickname "ICHRO" of the student "A" is input, and the "SHARE" key included in the input request m2 is touched, in STEP S213, the unique calculator ID "xxxx1" acquired from the scientific calculator 10A, and the input nickname "ICHRO" of the student "A" are registered in the data area 223a of the nickname memory area 223 in association with each other.

Figure 16B:
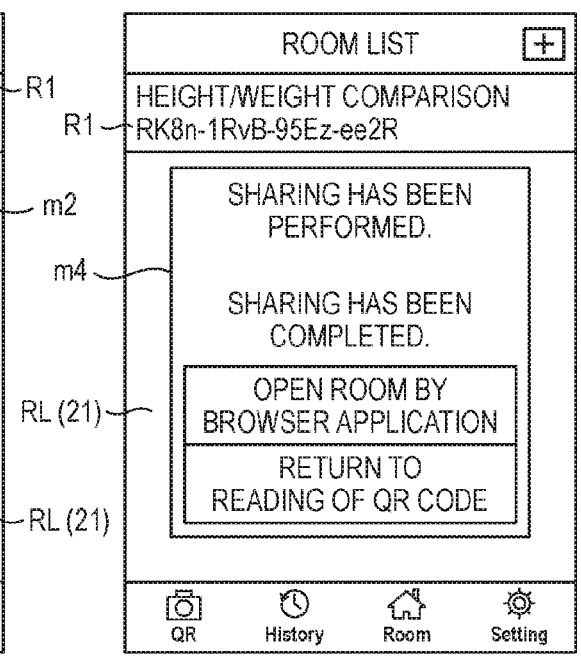
Figure 16C:
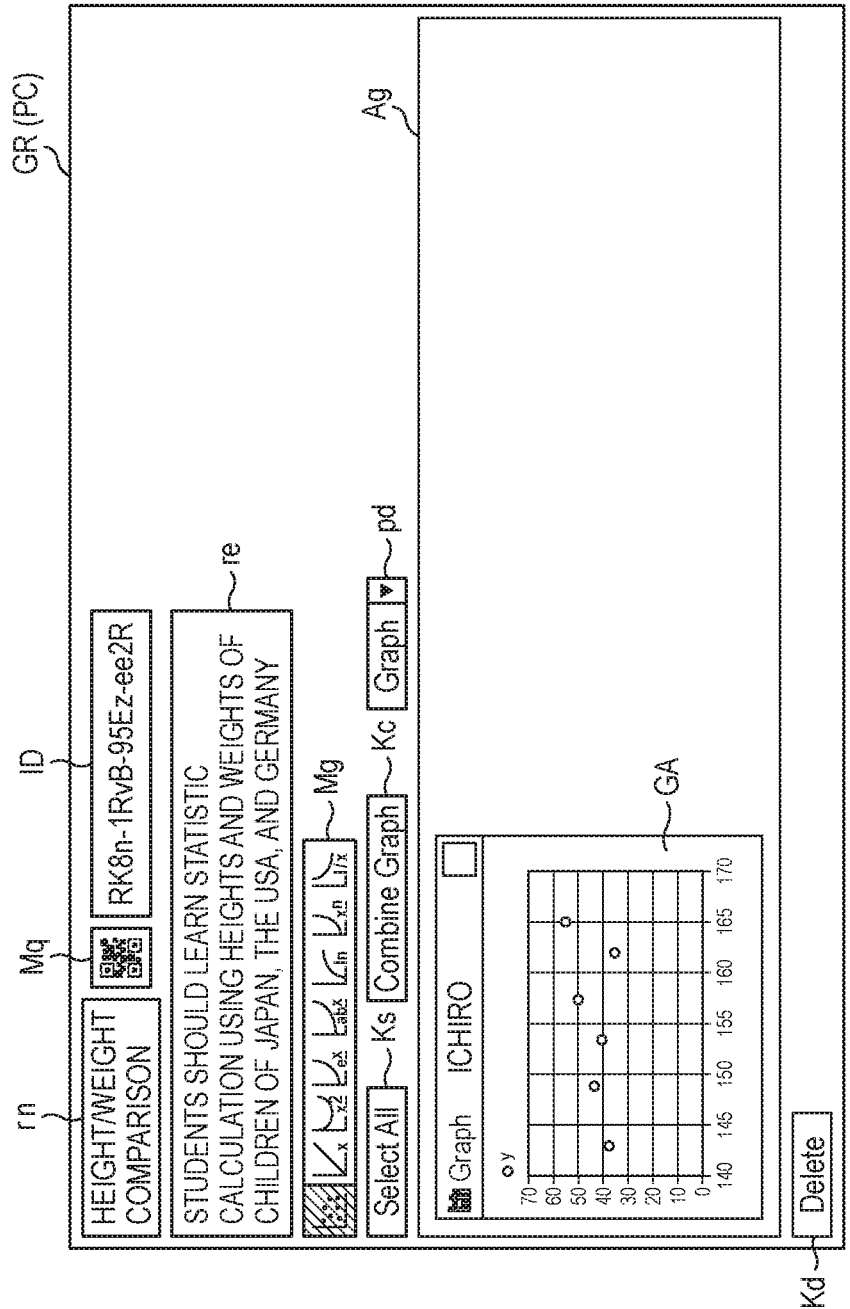

Thereafter, in STEP S215, data on various items such as the unique ID "xxxx1" of the calculator, the calculation function type (the statistic calculation function and the calculation type (linear regression of two-variable stack designation variable)), and the calculation object data items (the sample data items of the heights and weights of the Japan middle-school girls) acquired as the two-dimensional code content data item (QR data item) from the scientific calculator 10A, the room ID (group ID) "RK8n-1RvB-95Ez-ee2R" of the room "HEIGHT/WEIGHT COMPARISON" selected and designated as the sharing destination in STEP S223, and the input nickname "ICHRO" of the student "A" are transmitted to the compute server 30, and a sharing completion confirmation request m4 is displayed as shown in FIG. 16B.

If the compute server 30 receives the data on various items such as the unique ID "xxxx1" of the calculator, the calculation function type (the statistic calculation function and the calculation type (linear regression of two-variable stack designation variable)), and the calculation object data items (the sample data items of the heights and weights of the Japan middle-school girls) acquired as the two-dimensional code content data item (QR data item) corresponding to the scientific calculator 10A, in association with the room ID (the group ID) "RK8n-1RvB-95Ez-ee2R" of the room "HEIGHT/WEIGHT COMPARISON", and the nickname "ICHRO", from the communication apparatus 20 with the camera (STEP S313), in STEP S314, the two-dimensional code content data item (QR data item) and the nickname are saved in the dedicated data area 322A to the received room ID (group ID) "RK8n-1RvB-95Ez-ee2R".

Thereafter, if the room list screen RL (see FIG. 14) is displayed by the personal computer PC (the communication apparatus 20) of the teacher ("Yes" in STEP S218, and STEP S205), and the room name "HEIGHT/WEIGHT COMPARISON" R1 is selected, whereby the room operation menu Ms1 is displayed ("Yes" in STEP S206, and STEP S207), and the selection item (A) "OPEN ROOM BY BROWSER APPLICATION" is selected ("(A)" in STEP S208), in STEP S209, the browser application is activated, and the room ID (group ID) "RK8n-1RvB-95Ez-ee2R" of the selected room name "HEIGHT/WEIGHT COMPARISON" R1 is designated, and a request for opening the corresponding room is transmitted to the compute server 30.

Then, each calculation data item of the student "A" corresponding to the room ID (group ID) "RK8n-1RvB-95Ez-ee2R" of the compute server 30 (here, one data item for new registration) is calculated according to the calculation function type ("Yes" in STEP S316, and STEP S317), and image integration data Ag which is a list including the nickname "ICHRO" and a graph image GA in association with the corresponding calculation data item is generated, and a room display screen GR including the corresponding image integration data Ag is transmitted to and displayed on the personal computer PC (the communication apparatus 20) of the teacher (STEP S317).

Meanwhile, in a case where the selection item (Y) "TRANSMIT DATA BY MAIL" is selected in the data operation menu Ms2 displayed as shown in FIG. 15B on the communication apparatus 20 with the camera (the smart phone) ("(Y)" in STEP S221), in STEP S224, the mail application is activated, and the HP address (calculation site) of the compute server 30, and the two-dimensional code content data item (the QR data item) read from the scientific calculator 10A are transmitted to the mail address designated by the user (for example, the mail address of another communication apparatus 20), and can be registered therein.

In this way, other communication apparatuses 20 can acquire data on a unique calculator ID, a calculation function type (a statistic calculation function and a calculation type), and calculation object data items (or calculation result data items), as a two-dimensional code content data item (QR data item), from each scientific calculator 10, and transmits the acquired data to the compute server 30, whereby the corresponding data can be saved and registered in the registration data memory 322 for a corresponding room.

Therefore, according to the communication apparatuses 20 (such as a smart phone) of the computer system having the above described configuration, each communication apparatus receives the room ID (group ID) "RK8n-1RvB-95Ez-ee2R" of the room "HEIGHT/WEIGHT COMPARISON" generated in the registration data memory 322 of the compute server 30 by a two-dimensional code (QR code) data item or by mail, and registers the received room ID in the room ID memory area 224. Also, each communication apparatus acquires calculation data items calculated by the scientific calculators 10A, 10B, and so on, of the students "A", "B", and so on, and the unique IDs "xxxx1", "xxxx2", and so on, of the calculators in association with each other by a two-dimensional code (QR code) data item or by near field communication, and registers the nicknames "ICHRO", "YOKO", and so on, of the individual students "A", "B", and so on, input by the users, in the nickname memory area 223, in association with the unique IDs "xxxx1", "xxxx2", and so on, of the calculators, respectively. Subsequently, each communication apparatus transmits the calculation data items acquired from each of the scientific calculators 10A, 10B, and so on, and a nickname registered in association with the unique ID of the corresponding calculator, in association with the room ID (group ID) of a room selected from rooms registered in the room ID memory area 224 by the user, to the compute server 30, and saves the corresponding data in the registration data memory 322 for the selected room. Thereafter, if the room "HEIGHT/WEIGHT COMPARISON" is selected, and the compute server 30 is opened, the nickname "ICHRO", "YOKO", and so on, of each of the students "A", "B", and so on, saved in association with the room ID (group ID) "RK8n-1RvB-95Ez-ee2R" of the corresponding room, and corresponding calculation data items are received and displayed as an integrated data item.

As a result, it is possible to group calculation data items input by each of the scientific calculators 10A, 10B, 10C, and so on, of the individual students "A", "B", "C", and so on, and manage the calculation data item groups as integrated calculation data items. All of the teachers and the students can browse those integrated calculation data items, thereby learning.

Also, according to the communication apparatuses (such as smart phones) 20 of the computer system having the above described configuration, in a case of acquiring a calculation data item together with a unique calculator ID from any of the scientific calculators 10A, 10B, and so on, if any nickname associated with the received unique calculator ID has been registered in the nickname memory area 223, a nickname input request m2 including the registered nickname is displayed; whereas if any nickname has not been registered, a nickname input request m2 including no nickname is displayed, and a student nickname input by the user is registered in association with the acquired unique calculator ID in the nickname memory area 223.

Therefore, in the case of acquiring the calculation data item from any of the scientific calculators 10A, 10B, and so on, the time and effort of the user to re-input any student nickname registered already in association with the corresponding unique calculator ID can be saved.

Also, according to the communication apparatuses 20 (such as a smart phone) of the computer system having the above described configuration, in a case of transmitting a calculation data item acquired from any of the scientific calculators 10A, 10B, and so on, to the compute server 30, if any room registered in the room ID memory area 224 is not selected, the corresponding calculation data item is transmitted, as a calculation data item which is not associated with any registered room ID (group ID) and does not need to be integrated, to the compute server 30.

As a result, the compute server 30 directly receives and displays the transmitted calculation data item as a data item individually calculated.

Also, according to the compute server 30 of the computer system having the above described configuration, in a case where calculation data items received from the communication apparatuses 20 are associated with a room ID (a group ID), the server can integrate the received calculation data items in association with the corresponding room ID (group ID), and transmit the integrated calculation data item to the communication apparatuses 20, such that the integrated calculation data item is displayed; whereas in a case where calculation data items received from the communication apparatuses 20 are not associated with a room ID (a group ID), the server can individually process the corresponding calculation data items, and transmits the processed data items to the communication apparatuses 20 such that the calculation data items are displayed.

Further, according to the compute server 30 of the computer system having the above described configuration, in a case where calculation data items received from the communication apparatuses 20 are associated with a room ID (a group ID) and a nickname, the server can integrate the received calculation data items together with the corresponding nickname, in association with the corresponding room ID (group ID), and transmit the integrated data item including the corresponding nickname to the communication apparatuses 20, such that the integrated data item is displayed.

Also, in the above described embodiment, the teachers integrate calculation data items of the scientific calculators of the individual students in a class room. However, if the communication apparatuses 20 with the cameras retain the same room ID (group ID), it is possible to integrate calculation data items of different class rooms. For example, if students of the same group register the same room IDs (group IDs) for group learning in their communication apparatuses 20 with cameras, during studying at home, the individual students can transmit their calculation data items from the communication apparatuses 20 with the cameras to the compute server 30, whereby it is possible to integrate the calculation data items.

Figure 6:
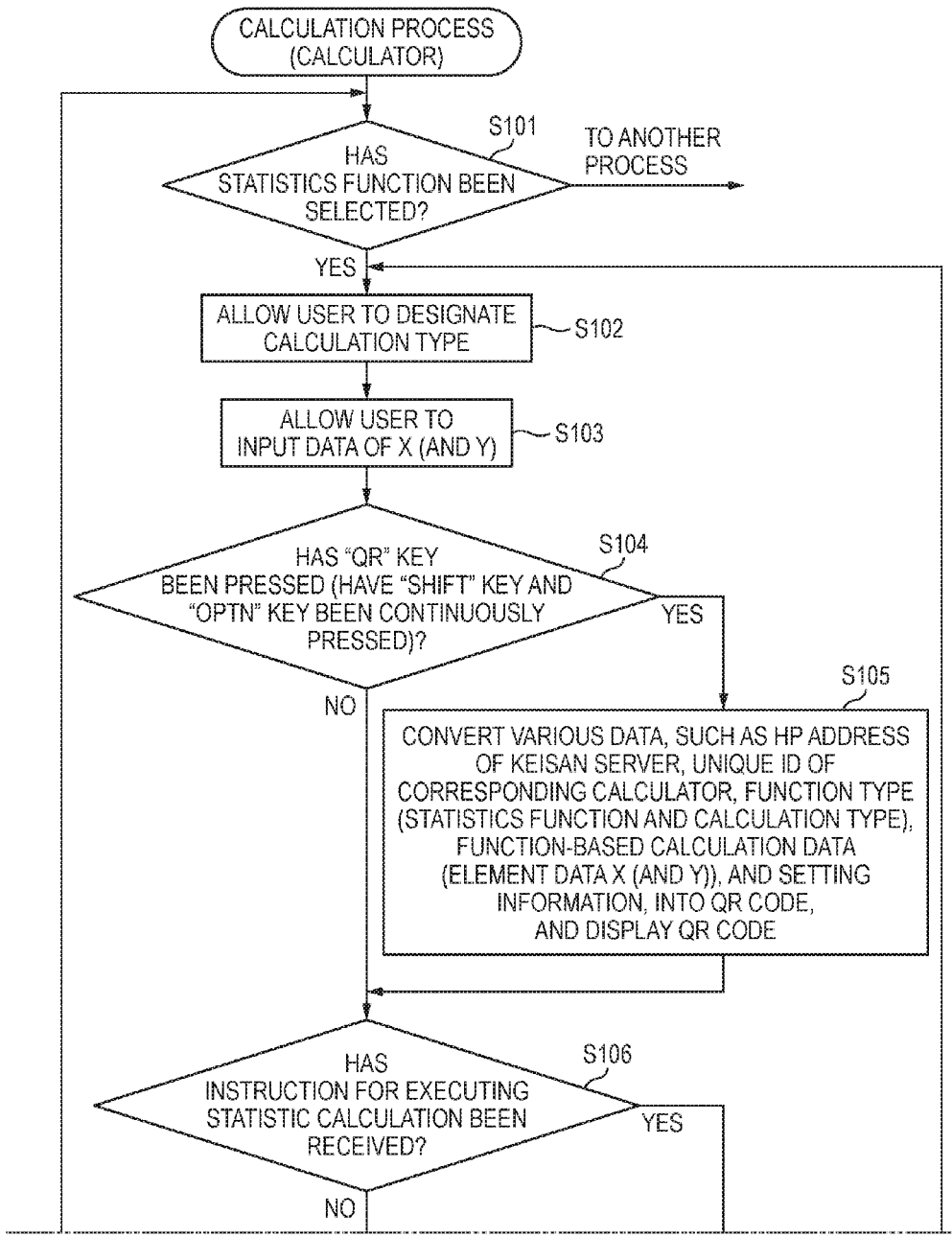
FIG. 6 is a flow chart illustrating a calculation process of the scientific calculator 10.
Figure 8:
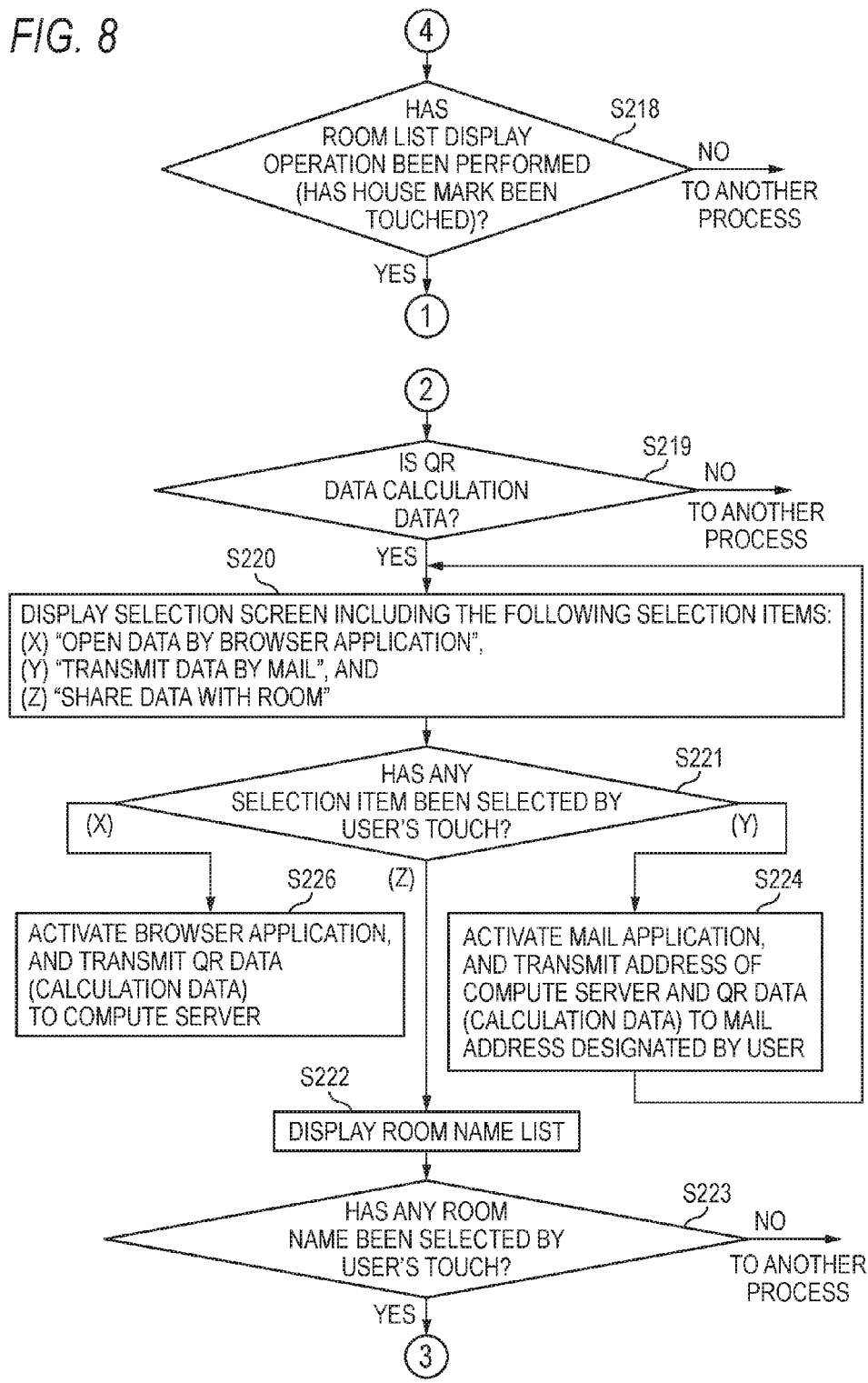
FIG. 8 is the other part of the calculation data transmission/reception process of the communication apparatus 20 with the camera.
Figure 9:
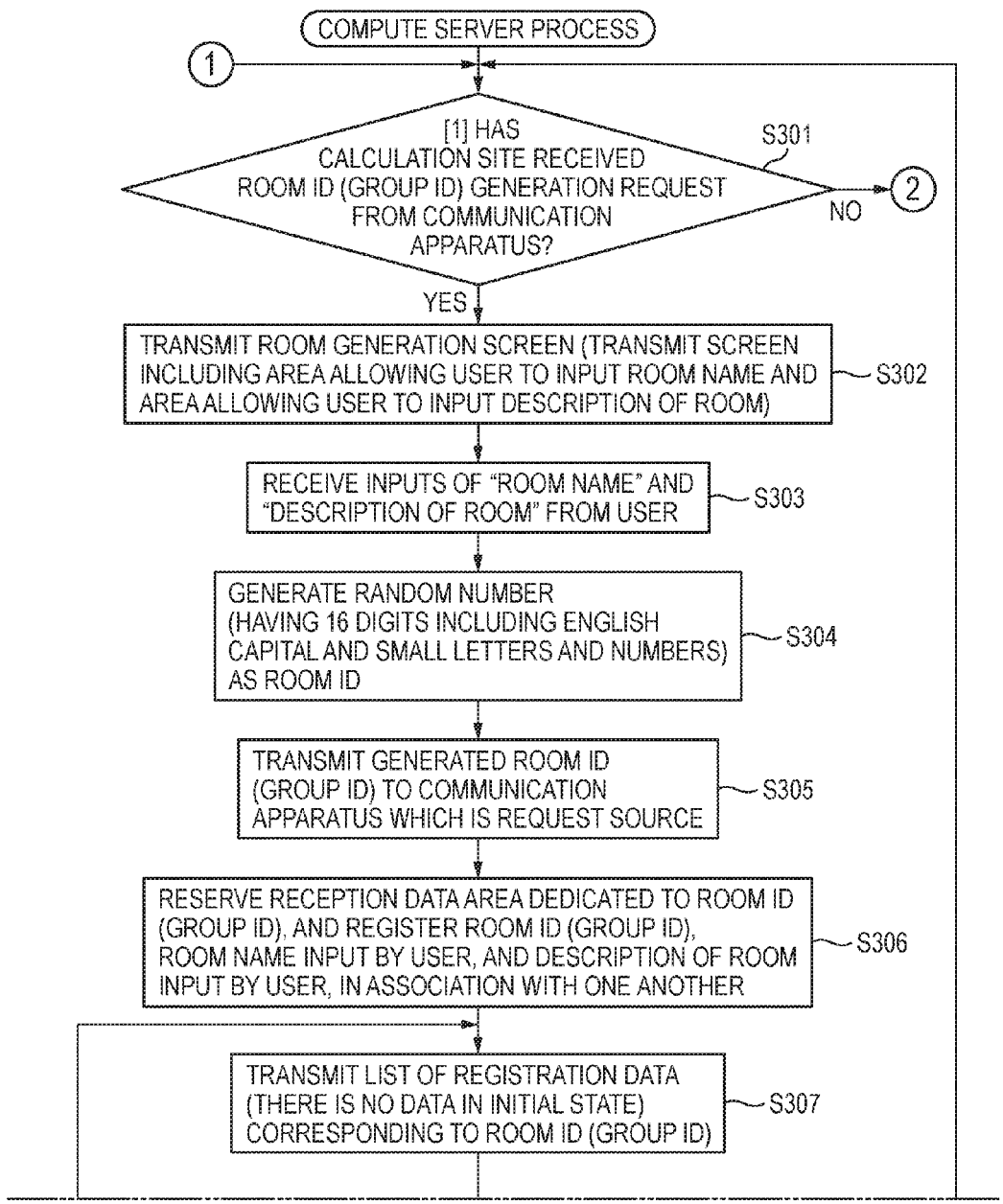
FIG. 9 is a flow chart illustrating a part of a server process of the compute server 30.

Also, the method of each process of the computer system described in each embodiment described above, that is, the method of each of various processes such as the calculation process of each scientific calculator (information display apparatus) 10 shown in the flow chart of FIG. 6, the calculation data transmission/reception process of each communication apparatus 20 with a camera shown in the flow chart of FIG. 8, and the server process of the compute server 30 shown in the flow chart of FIGS. 9 and 10 can be stored, as a program which is executable in any computer, in recording media, such as a memory card (such as a ROM card or a RAM card), a magnetic disk (such as a floppy (a trademark) disk or a hard disk), an optical disk (such as a CD-ROM or a DVD), or a semiconductor memory, to be distributed.

In addition, program data for realizing the methods may be transmitted in a program code form on a network N, and the program data is loaded into a computer which is an electronic apparatus is connected to the network N by a communication unit, thereby realizing the calculation function, the calculation data transmission/reception function, and the server function described above.

The present invention is not limited to the embodiments, and may have various modifications within the scope without departing from the spirit thereof at the time of carrying out the invention. In addition, the embodiments include inventions of various stages, and thus various inventions may be extracted by appropriate combinations of a plurality of disclosed constituent elements. For example, even if some constituent elements are deleted from all the constituent elements shown in the embodiments, or some constituent elements are combined in different forms, a configuration in which the constituent elements are deleted or combined may be extracted as an invention in a case of being capable of solving the problems described in the Problem that the Invention is to Solve and achieving the effects described in the Advantage of the Invention.

What is claimed is:

1. A communication apparatus comprising:
   a memory; and a processor that is configured to perform operations including:
  acquiring device IDs and calculation data items from a plurality of calculation devices, respectively, each device ID and each calculation data item being in association with each other;
  in a case where a group ID stored in the memory is selected:
    transmitting names data items corresponding to the acquired device IDs and the acquired calculation data items corresponding to the acquired device IDs, in association with the group ID to a server, and
    receiving an integrated data item being obtained based on the names data items and the acquired calculation data items associated with the group ID; and
  in a case where the group ID stored in the memory is not selected:
    transmitting the acquired calculation data items without being associated with the group ID to a server, and
    receiving unintegrated data items being obtained based on the acquired calculation data items without being associated with the group ID.

2. The communication apparatus according to claim 1, wherein the integrated data item includes graphs obtained based on the calculation data items associated with the group ID.

3. The communication apparatus according to claim 1, wherein:
  the processor is further configured to perform operations including:
    setting the names data items in association with the acquired device IDs by an operator.

4. The communication apparatus according to claim 3, wherein:
  the processor is further configured to perform operations including:
    in a case where any of the acquired device IDs is previously registered in the memory, displaying the registered name in association with the corresponding device ID; and
    in a process of registering the names in association with the acquired device IDs, in a case where any of the acquired device IDs is not previously registered in the memory, registering a name input according to the operator's operation, in association with the corresponding device ID.

5. The communication apparatus according to claim 1, wherein:
  the processor is further configured to perform operations including:
    in the process of acquiring the device IDs and the calculation data items from the plurality of calculation devices, acquiring group IDs from another communication apparatus which has acquired said group IDs from the server, and storing the acquired group IDs.

6. The communication apparatus according to claim 1, wherein:
  the processor is further configured to perform operations including:
    in the process of acquiring the device IDs and the calculation data items from the plurality of calculation devices, acquiring the device IDs and the calculation data items from the calculation devices by imaging two-dimensional codes displayed corresponding to the device IDs and the calculation data items.

7. The communication apparatus according to claim 1, wherein the integrated data item is obtained by integrating the names data items and the acquired calculation data items associated with the group ID.

8. The communication apparatus according to claim 1, wherein:
  the processor is further configured to perform operations including:
    receiving the group IDs from a server; and
    registering the received group IDs.

9. The communication apparatus according to claim 1, wherein each name corresponding to each device ID is one of a user's name, a nickname, a number, and a symbol.

10. A method for controlling a computer of a communication apparatus including a memory, the method comprising:
  acquiring device IDs and calculation data items from a plurality of calculation devices, respectively, each device ID and each calculation data item being in association with each other;
  in a case where a group ID stored in the memory is selected:
    transmitting names data items corresponding to the acquired device IDs and the acquired calculation data items corresponding to the acquired device IDs, in association with the group ID to a server, and
    receiving an integrated data item being obtained based on the names data items and the acquired calculation data items associated with the group ID; and
  in a case where the group ID stored in the memory is not selected:
    transmitting the acquired calculation data items without being associated with the group ID to a server, and
    receiving unintegrated data items being obtained based on the acquired calculation data items without being associated with the group ID.

11. The method according to claim 10, wherein the integrated data item includes graphs obtained based on the calculation data items associated with the group ID.

12. The method according to claim 10, further comprising setting the names data items in association with the acquired device IDs by an operator.

13. The method according to claim 12, further comprising:
  in a case where any of the acquired device IDs is previously registered in the memory, displaying the registered name in association with the corresponding device ID; and
  in a process of registering the names in association with the acquired device IDs, in a case where any of the acquired device IDs is not previously registered in the memory, registering a name input according to the operator's operation, in association with the corresponding device ID.

14. The method according to claim 10, further comprising, in the process of acquiring the device IDs and the calculation data items from the plurality of calculation devices, acquiring group IDs from another communication apparatus which has acquired said group IDs from the server, and storing the acquired group IDs.

15. The method according to claim 10, further comprising, in the process of acquiring the device IDs and the calculation data items from the plurality of calculation devices, acquiring the device IDs and the calculation data items from the calculation devices by imaging two-dimensional codes displayed corresponding to the device IDs and the calculation data items.

16. The method according to claim 10, wherein the integrated data item is obtained by integrating the names data items and the acquired calculation data items associated with the group ID.

17. The method according to claim 10, further comprising:
  receiving the group IDs from a server; and
  registering the received group IDs.

18. The method according to claim 10, wherein each name corresponding to each device ID is one of a user's name, a nickname, a number, and a symbol.

19. A non-transitory recording medium containing a program which causes a computer of a communication apparatus which includes a memory to perform operations comprising:
  acquiring device IDs and calculation data items from a plurality of calculation devices, respectively, each device ID and each calculation data item being in association with each other;
  in a case where a group ID stored in the memory is selected:
    transmitting names data items corresponding to the acquired device IDs and the acquired calculation data items corresponding to the acquired device IDs, in association with the group ID to a server, and
    receiving an integrated data item being obtained based on the names data items and the acquired calculation data items associated with the group ID; and
  in a case where the group ID stored in the memory is not selected:
    transmitting the acquired calculation data items without being associated with the group ID to a server, and
    receiving unintegrated data items being obtained based on the acquired calculation data items without being associated with the group ID.

* * * * *